United States Patent
Kalabic et al.

(10) Patent No.: US 11,691,765 B2
(45) Date of Patent: Jul. 4, 2023

(54) TRACKING NEIGHBORING QUASI-SATELLITE ORBITS AROUND MARS'S MOON PHOBOS

(71) Applicant: Mitsubishi Electric Research Laboratories, Inc., Cambridge, MA (US)

(72) Inventors: Uros Kalabic, Jamaica Plain, MA (US); Vivek Muralidharan, West Lafauette, IN (US); Avishai Weiss, Cambridge, MA (US)

(73) Assignee: MITSUBISHI ELECTRIC RESEARCH LABORATORIES INC., Cambridge, MA (US)

( * ) Notice: Subject to any disclaimer, the term of this patent is extended or adjusted under 35 U.S.C. 154(b) by 518 days.

(21) Appl. No.: 16/734,055

(22) Filed: Jan. 3, 2020

(65) Prior Publication Data
US 2021/0206517 A1 Jul. 8, 2021

(51) Int. Cl.
*G05D 1/00* (2006.01)
*B64G 1/10* (2006.01)
*B64G 1/24* (2006.01)
*B64G 1/26* (2006.01)

(52) U.S. Cl.
CPC ............. *B64G 1/242* (2013.01); *B64G 1/10* (2013.01)

(58) Field of Classification Search
None
See application file for complete search history.

(56) References Cited

U.S. PATENT DOCUMENTS

| | | | | |
|---|---|---|---|---|
| 6,089,507 A * | 7/2000 | Parvez | ..................... | B64G 3/00 244/164 |
| 6,097,997 A * | 8/2000 | Belbruno | ............... | B64G 1/007 244/158.6 |
| 6,508,438 B2 | 1/2003 | Eyerly | | |
| 8,781,741 B2 | 7/2014 | Cheetham | | |
| 9,399,528 B2 | 7/2016 | Dargent | | |
| (Continued) | | | | |

OTHER PUBLICATIONS

Baresi, Orbit Maintenance of Quasi-Satellite Trajectories via Mean Relative Orbit Elements, Oct. 2018, pp. 1-16 (Year: 2018).*

(Continued)

*Primary Examiner* — Adam D Tissot
*Assistant Examiner* — Michael T Silva
(74) *Attorney, Agent, or Firm* — Gennadiy Vinokur; Hironori Tsukamoto

(57) ABSTRACT

A method and system for activating thrusters of a vehicle for trajectory-tracking control of the vehicle. A transfer orbit generator to generate a transfer orbit for the vehicle from an initial orbit to a target orbit, and a feedback stabilization controller. Compute the target orbit for the vehicle about the celestial body. Compute a free trajectory with patch points along the free trajectory using a free trajectory module, each patch point includes a position and a velocity. Determine a feedback gain at each patch point using a feedback gain module, wherein a state penalty function at each patch point is set to match a state uncertainty function at the same patch point. Apply the feedback gain at each patch point to map the position and the velocity at each patch point to delta v commands, to maintain the target orbit using a feedback stabilization controller.

20 Claims, 17 Drawing Sheets

(56) References Cited

U.S. PATENT DOCUMENTS

| | | | | |
|---|---|---|---|---|
| 2002/0193920 | A1* | 12/2002 | Miller | G05B 23/0245 701/9 |
| 2004/0069905 | A1* | 4/2004 | Goodzeit | B64G 1/26 244/169 |
| 2012/0248253 | A1* | 10/2012 | Cheetham | G05D 1/00 701/13 |
| 2014/0032018 | A1* | 1/2014 | Grover | B64G 1/242 701/3 |
| 2017/0269610 | A1* | 9/2017 | Weiss | B64G 1/242 |
| 2017/0283094 | A1* | 10/2017 | Ho | B64G 1/242 |
| 2017/0297746 | A1* | 10/2017 | Amalric | G05D 1/04 |

OTHER PUBLICATIONS

Chen, Effective Stability of Quasi-Satellite Orbits in the Spatial Problem for Phobos Exploration, Jun. 2020, pp. 1-11 (Year: 2020).*

Martin, Quasi-Satellite Orbits Around Phobos for the Sample Return Mission, May 2017, pp. 1-7 (Year: 2017).*

McCamish, Autonomous Distributed Control of Simultaneous Multiple Spacecraft Proximity Maneuvers, Jul. 2010, pp. 630-642 (Year: 2010).*

Muralidharan, Orbit Maintenance Strategies for Sun-Earth/Moon Liberation Point Missions, Dec. 2017 (Year: 2017).*

Muralidharan, Tracking Neighboring Quasi-Satellite Orbits Around Phobos, Jul. 2020, pp. 1-8 (Year: 2020).*

Wallace, Orbital Operations for Phobos and Deimos Exploration, Aug. 2012, pp. 1-10 (Year: 2012).*

Goncalv et al. "Analysis of the influence of orbital disturbances applied to an artificial lunar satellite" XVII Coloquio Brasileiro de Dinamica Orbital, Journal of Physics: Conference Series 641, 2015, 012028.

Maiti et al., "Trajectory Design using State Feedback for Satellite on a Halo Orbit" European Journal of Advances in Engineering and Technology, 2015, 2(12): 53-58.

* cited by examiner

| $r$ | CR3BP | | Ephemeris | |
|---|---|---|---|---|
| | Mean (m/s) | $1\sigma$ (m/s) | Mean (m/s) | $1\sigma$ (m/s) |
| $10^{-4}$ | 9.40 | 0.85 | 9.34 | 0.98 |
| $10^{-3}$ | 6.85 | 0.59 | 6.66 | 0.58 |
| $10^{-2}$ | 3.82 | 0.29 | 3.64 | 0.29 |
| $10^{-1}$ | 1.99 | 0.19 | 1.95 | 0.19 |
| $10^{0}$ | 1.13 | 0.16 | 1.14 | 0.16 |

*Table 1: 30 day trajectory tracking station-keeping cost for different choices of $r$.*

FIG. 4

| α | N | mean (m/s) | std. dev (m/s) |
|---|---|---|---|
| 1 | 2 | 0.45 | 0.49 |
| | 3 | 0.78 | 0.46 |
| | 4 | 0.86 | 0.48 |
| | 5 | 0.73 | 0.38 |
| 0.5 | 2 | 3.04 | 0.49 |
| | 5 | 4.56 | 0.46 |
| 0 | 5 | 8.07 | 0.47 |

(*Table #2*: *30 day trajectory tracking station-keeping fuel cost for different choices of N*)

FIG. 9

TRACKING NEIGHBORING QUASI-SATELLITE ORBITS AROUND MARS'S MOON PHOBOS

FIELD

The present disclosure relates generally to transferring a spacecraft through multiple similar orbits, and, more particularly, to methods and systems for generating a fuel-efficient transfer orbit or transfer trajectory by leveraging multi-body dynamics on the spacecraft during similar orbital transfers about Phobos.

BACKGROUND

Previous conventional missions to Mars have orbital designs based on a two-body conic orbit structure. However, Mars has two moons, Phobos and Deimos, wherein the orbital characteristics of Phobos, orbital motion of Phobos, and Phobos's close orbit around Mars, all produce very unusual effects, making planning for orbital designs to missions to Mars very complex. In fact, planning orbital designs to Mars is nothing like planning orbital designs between different orbits of Earth.

For example, a conventional transfer orbit may be referred as a transfer trajectory that a spacecraft transfers from a low Earth orbit (LEO), i.e. an initial orbit, into a geostationary Earth orbit (GEO), i.e. second orbit. The conventional orbital characteristics of the GEO is a circular orbit at a fixed radius that causes a spacecraft to orbit above the Earth's equator. Wherein an object in the GEO can have a conventional orbital period equal to an Earth's rotational period, and seem motionless at a fixed position in the sky to someone looking up from Earth at the object in space.

Whereas, Phobos's "un-conventional and unusual" orbital characteristics orbit Mars below the synchronous orbit radius, meaning that it moves around Mars faster than Mars itself rotates. Therefore, from a point of view of an observer on the surface of Mars, Phobos rises in the west, moves comparatively rapidly across the sky and sets in the east, approximately twice each Martian day. Phobos's "un-conventional and unusual" orbit is so low that its angular diameter, as seen by an observer on Mars, varies visibly with Phobos's position in the sky. By comparison, the Sun has an apparent size of about 0.35° in the Martian sky. Phobos's phases, in-as-much as they can be observed from Mars, takes about one third of a day, i.e. Phobos's synodic period, to run their course, a mere 13 seconds longer than Phobos's sidereal period. All of these "un-conventionally and unusually" aspects, make planning Phobos orbit designs for missions in the Mars-Phobos system very challenging, unlike planning for conventional orbital designs from Earth's LEO into Earth's GEO.

Such complexity for planning Phobos orbital designs is further obtained from past missions to Mars. For example, some past missions to Mars, such as the Mars Orbiter Mission (MOM), the Mars Reconnaissance Orbiter (MRO), and the Mars Atmosphere and Volatile Evolution (MAVEN) mission, have all orbital designs based on a two-body conic orbit structure, which orbital designers still believe is the best orbital design approach. However, as noted above, planning orbital design missions to Mars and within Phobos orbits in the Mars-Phobos system is very complex due to these multiple variables, i.e. "un-conventionally and unusually" aspects, which makes solving orbital designs near impossible by orbital designers.

Conventional space flight, conventional trajectory design and navigation are known in mathematics as an N-body problem, which is a well-known difficult problem in mathematics describing the gravitational attraction between bodies in space. When designing a conventional mission, the N-bodies can be any combination of the spacecraft with Earth, the sun, and other bodies in the solar system. However, the conventional orbit design approach using Newton's laws of gravity and motion, which govern the orbits, is simple enough for two bodies, i.e. Earth and the Sun. However, when designing orbital designs for Mars-Phobos system missions including the Phobos orbits, there is nothing conventional in orbital design, in fact, as noted above, it is very "un-conventional and unusual" when solving for Mars-Phobos system orbital design problems. The fact of adding in additional multi-varriables to the Mars-Phobos system orbital design problem, changes the trajectory behavior and becomes compoundingly complex and confusing. If you change the initial conditions even infinitesimally, and trajectories can change unpredictably and dramatically, making them essentially impossible to calculate except in the most simplest cases.

For this reason, conventional trajectory designers have worked with two bodies at a time, as noted above for the above past missions to Mars. For two bodies, the equations can be solved exactly, which results in trajectories known as conics, because they are all various arcs that exist on the surface of a cone. Mission designers start with Earth and the spacecraft and find conics that send the craft toward its target, then shift their focus to the target body and the spacecraft to find intersecting conics that bring the probe into orbit. They then optimize the choice of conics and connecting paths to find the best trajectory. However, planning orbital designs among orbits of Phobos is contrastingly differented, as noted above.

Therefore, a need exists to create a new approach to orbital designs for missions to the Mars-Phobos system, which also includes tracking the spacecraft after having entered the new Phobos orbit. Further, the conventional problems of orbital tracking and orbital design using the conventional two-body conic orbit structure needs to be re-considered. The new Mars-Phobos system orbital designs for missions to the Mars-Phobos system, needs to address tracking and orbital designs that preserve fuel efficient transfers of Phobos orbits that also include leveraging the multi-body dynamics on the spacecraft.

SUMMARY

The present disclosure relates to transferring a spacecraft through multiple similar orbits, and, more particularly, to methods and systems for generating a fuel-efficient transfer among orbits in the Mars-Phobos system, that leverages multi-body dynamics on the spacecraft using a three-body assumption.

Several realizations were discovered when studying the Martian moons; including the realization, that no longer is it possible, to restrict the orbital design with a two-body assumption, as is conventional believed by today's orbital designers for Mars-Phobos system missions. At least one reason, among many reasons, is because the Mars's moons have a relatively small mass and therefore the primary body, i.e., Mars, still has a dominant gravitational effect even on spacecraft that are in close proximity to a moon. Another realization is having a better understanding of the "un-conventionally and unusually" aspects, of the Phobos orbits, in view of planning orbital designs from an initial Phobos orbit into a similar target Phobos orbit.

For example, several realizations of the present disclosure include performing necessary Mars-Phobos orbital designs under a three-body assumption. In particular, using a restricted three-body model in which the effect of gravitation due to the spacecraft is assumed negligible. With this assumption that the dominant bodies orbit their barycenter in circular orbits, the problem of finding a closed orbit for the spacecraft is termed a circular restricted three-body problem (CR3BP). Multiple solutions obtained from experimentation were discovered using the CR3BP, and at least one of interest included a quasi-satellite orbit (QSO), so called due to the shape of its orbit resembling an ordinary, two-body satellite orbit. In the case of the Mars-Phobos system, the QSO is discovered as a good choice of orbit around Phobos due to its distance from Phobos being far enough to ensure that the spacecraft does not come into contact with Phobos's surface while being near enough to make detailed observations, among other aspects. In considering this problem of orbital tracking in a mission to Phobos, experimental work was motivated, in part, by the planned Mars Moon Exploration (MMX) mission. Upon further studying Phobos orbits and their very unusual orbital characteristics, some aspects learned is that the mass ratio of Phobos is $\mu=1.6606 \ 10^{-8}$, which makes Phobos so small relative to Mars, that the orbits where an influence of Mars is negligibly smaller than Phobos itself. Phobos dimensions are 27 km×22 km×18 km, and retain too little mass to be rounded under its own gravity. Further, Phobos does not have an atmosphere due to its low mass and low gravity, such that Phobos is one of the least reflective bodies in the Solar System, with an albedo of about 0.071. Infrared spectra show that Phobos has a carbon-rich material found in carbonaceous chondrites, in what appears to be a composition showing similarities to that of Mars' surface. In addition, a density of Phobos is that is too low to be solid rock, and is believed to have significant porosity. Based upon the further learned knowledge of Phobos's orbits, at least one realization included the need for further tracking the spacecraft, after the spacecraft achieved the new Phobos orbit. At least one reason is due to the many unconventional and unusual variables and characteristics when compared to conventional orbital transfers between LEO and GEO, which need to be further considered in planning orbital designs.

Some embodiments consider two approaches that include tracking of the Mars-Phobos QSO. The first approach is based on a trajectory-tracking method with a solution to a linear quadratic regulator (LQR) problem. At least one unique aspect of this first approach is the way in which the state-penalty matrix is chosen, which is set to equal a structure of a priori state uncertainty matrix. For example, about this first approach, a processor can operate a transfer orbit generator stored in a memory to generate a transfer orbit for the vehicle from an initial orbit to a target orbit. Based on computing the target orbit for the vehicle about the celestial body. A free trajectory with patch points along the free trajectory can be computed using a free trajectory module, such that each patch point along the free trajectory includes a position and a velocity. Wherein, a feedback gain module determines a feedback gain at each patch point along the free trajectory, such that a state penalty function at each patch point of the free trajectory is set to match a state uncertainty function at the same patch point. In other words, the state penalty function is a quadratic function that includes state penalty matrices, such that the state penalty matrices are determined by propagating a Riccati difference equation backwards in time. Wherein, the state uncertainty function is derived from the quadratic function, and the state uncertainty function includes state uncertainty matrices. The state uncertainty matrices are determined by propagating closed-loop system dynamics, forwards in time, to obtain the state uncertainty matrices, and then repeating the process iteratively until a convergence threshold.

In regard to the second approach, at least one second unique aspect that is an alternative idea of stabilizing to a neighborhood of the reference QSO, includes tracking an orbit with the same constant of integration as the reference. This constant of integration, called the Jacobi constant, is a measure of an energy of the orbit. QSOs with the same Jacobi constant can be guaranteed to be close to one another and therefore staying at this energy level is guaranteed to keep the resulting trajectory in a neighborhood of the reference. In other words, in regard to the second approach, a processor can operate a feedback stabilization controller; the feedback stabilization controller can apply the computed feedback gain at each patch point, to map the position and the velocity at each patch point, to delta v commands, in order to maintain the target orbit. Wherein, the processor to thruster commands may convert the delta v commands, or alternatively, the delta v commands can be outputted to a thruster command module. The thruster command module can receive the delta v commands, and convert the delta v commands to thruster commands. Then, the thruster command module can send the thruster commands to at least one thruster processor of the at least one thruster, to activate the at least one thruster for trajectory-tracking control of the vehicle.

Although closed in the case of the CR3BP, in reality QSOs do not actually exist. However, a QSO in the CR3BP can be grown from the closed orbit solution of the CR3BP. Similarly, although constant in the case of the CR3BP, in reality this energy measure may not be constant but can be fortunately tightly bounded in a case of the Mars-Phobos system.

At least one pivotal variable in orbital transfer among the Phobos orbits that was learned from experimentation is referred to as "delta v" or change in velocity, which is a working synonym for an amount of fuel a spacecraft must carry to shift between Phobos orbits and make necessary velocity changes once the spacecraft leaves an initial orbit to a new Phobos orbit or target orbit. Moving the spacecraft from one trajectory to another, among the Phobos orbits, can be a predetermined measured change in velocity of the spacecraft, resulting in a change of Phobos orbit for the spacecraft. This change or transfer orbit considers gravitational disturbances that influence the dynamics of the spacecraft, while in the initial Phobos orbit, during the transfer to a new Phobos orbit, as well as after the spacecraft has achieved the new Phobos orbit. One approach to minimize delta v, can be to incorporate "gravity assist" of a celestial body's orbit, in order to accelerate, slow, or redirect a spacecraft, i.e. vehicle or space probe, depending on the direction the spacecraft approaches relative to the celestial body's orbit. Other additional techniques learned from experimentation can include using more than two maneuvers during transferring between orbits, combining orbit raise and inclination change schemes.

While these techniques to minimize delta v, i.e. gravity assist and orbit raise and inclination change schemes, all demonstrate individual improvements to the orbital transfer, however, none significantly take advantage of the unique variables and characteristics of the Phobos orbits. For example, with regard to Phobos orbits in the Mars-Phobos system, there exist close-to-stable, planar orbits called distant retrograde orbits (DROs) and these DROs keep the spacecraft at a relatively far distance from Phobos. Wherein, three-dimensional, quasi-periodic structures, quasi-satellite orbits (QSOs), as noted above, exist in the neighborhoods of DROs, such that these are considered candidate trajectories for potential missions, according to the present disclosure.

For example, conventional orbit designs to the Mars-Phobos system most likely fail to consider these "unique Phobos orbits" because some orbits are planar orbits and are not good for observing the entire surface of Phobos, which is a high priority factor for conventional designers of orbital design for Mars-Phobos system missions. At least one realization of the present disclosure is that once the spacecraft motion is significantly away from a primary gravitational body, the spacecraft motion is influenced by a gravitation of other gravitational bodies. Solutions to the circular restricted three body problem (CR3BP) can provide a better approximation of spacecraft motion, as they consider the spacecraft motion subject to gravitational forces in Phobos orbits.

Another reason the designers of conventional orbit design may have failed to consider these "unique Phobos orbits" is due to the challenge of leveraging this gravitational influence that is confounded by the complexity of orbital design within the Mars-Phobos system perturbed significantly by multiple variables, as noted above. This difference, among many differences over conventional orbital designs, makes the methods and systems of the present disclosure described herein truly innovative. The disclosed methods and systems provide unique operational and performance advantages as listed specifically herein, such that more advantages and benefits will be further disclosed.

The present disclosure addresses aspects of the above-discussed problems by providing methods and systems of generating orbital transfers using these "unique Phobos orbits". These methods and systems may be used in controlling thruster operations via activation to move the spacecraft, i.e. communication satellites and other spacecraft, of Phobos orbits approximate to celestial bodies, i.e. moons of Mars or Mars. The Phobos orbital transfer generation methods and systems of the present disclosure provide innovative techniques for transferring spacecraft from one Phobos orbit to another similar Phobos orbit using significant gravitational influences from these "unique Phobos orbits". For instance, a spacecraft may be transferred or moved from an initial Phobos orbit at a specific inclination to any other Phobos orbit(s) within the Mars-Phobos system. In one particular implementation, the multi-bodies in the transfer determination can be Mars (about which the spacecraft is to orbit) and/or Phobos orbits.

In practice, the transfer Phobos orbit or trajectory can be determined, such as by a transfer orbit generator or similar computer-based tool, to make use of fuel efficient aspects by leveraging gravitational influences to improve transfer performance, by non-limiting example.

Some embodiments move the spacecraft from one trajectory to another using a predetermined measured change in velocity of the spacecraft, which can be a generated transfer Phobos orbit solution determined by the transfer orbit generator, which results in a change of an initial Phobos orbit for the spacecraft to a similar Phobos target orbit. Wherein the generated transfer Phobos orbit solution can include delta v commands that are converted to thruster commands, that are used for controlling one or more thrusters of the propulsion systems of the spacecraft via a thruster controller of the spacecraft propulsion system that directs the spacecraft to the target trajectory, resulting in the change of Phobos orbit for the spacecraft.

The methods and systems of the present disclosure incorporate the realization of leveraging these unique Phobos orbits characteristics for gravitational assist, as this provides numerous benefits to transfer performance and transfer availability. With this in mind, the Phobos orbit transfer generator (and generation methods) can be taught by describing the concept, technique, and a procedure that is used to take advantage of the natural interactions of these unique Phobos orbits on a spacecraft to generate Phobos orbit transfers that differ significantly from conventional orbit transfers, i.e. conventional Hohmann transfers. For example, the Phobos orbital designs from an initial Phobos orbit into a target Phobos orbit, consider the multi-variables, i.e. (1) unusual orbital characteristics of Phobos; (2) unusual orbital motion of Phobos; (3) Phobos's unusually close orbit around Mars; (4) along with other known perturbations, i.e. complex motion(s) of a massive body subject to forces other than the gravitational attraction of a single other massive body, wherein the other forces can include a third (fourth, fifth, etc.) body, resistance, as from an atmosphere, and the off-center attraction of an oblate or otherwise misshapen body.

Some embodiments of the present disclosure include generating efficient transfer orbits among the Phobos orbits using the transfer orbit generator via a processor connected to a computer. These embodiments can include, a processor to implement modules for identifying a target Phobos orbit for the spacecraft about the first celestial body, such as Phobos. The transfer Phobos orbit generator (i.e. one or more module, computer program/software, etc), generates the target Phobos orbit for the spacecraft. Such that the target Phobos orbit is similar to the initial Phobos orbit in the Mars-Phobos system, and that these Phobos orbits are close-to-stable, planar orbits called distant retrograde orbits (DROs). These DROs keep the spacecraft at a relatively far distance from Phobos; such that, three-dimensional, quasi-periodic structures, quasi-satellite orbits (QSOs), as noted above, exist in the neighborhoods of DROs, which are considered candidate trajectories for potential missions.

According to an embodiment of the present disclosure, a system for activating at least one thruster of a propulsion system of a vehicle for trajectory-tracking control of the vehicle. The system including a memory having stored data, the data includes executable modules, vehicle data and historical space data. An input interface receives space data. A processor operates a transfer orbit generator to generate a transfer orbit for the vehicle from an initial orbit to a target orbit, and a feedback stabilization controller. The processor computes the target orbit for the vehicle about the celestial body. Computes a free trajectory with patch points along the free trajectory using a free trajectory module, such that each patch point includes a position and a velocity. Determines a feedback gain at each patch point along the free trajectory using a feedback gain module, such that a state penalty function at each patch point of the free trajectory is set to match a state uncertainty function at the same patch point. Applies the feedback gain at each patch point to map the position and the velocity at each patch point to delta v commands, in order to maintain the target orbit using a feedback stabilization controller. Outputs the delta v commands, to activate the at least one thruster for the trajectory-tracking control of the vehicle.

According to another embodiment of the present disclosure, a method for activating at least one thruster of a propulsion system of a vehicle for trajectory-tracking control of the vehicle. The method uses a processor connected to a memory storing executable modules, vehicle data and historical space data. Wherein the processor operates a transfer orbit generator to generate a transfer orbit for the vehicle from an initial orbit to a target orbit, and a feedback stabilization controller. The method including computing a target orbit for the vehicle about a celestial body using space data received via an input interface. Computing a free trajectory with patch points along the free trajectory using a free trajectory module, such that each patch point includes a position and a velocity. Determining a feedback gain at each patch point along the free trajectory using a feedback gain module, such that a state penalty function at each patch point of the free trajectory is set to match a state uncertainty function at the same patch point. Applying the feedback gain at each patch point to map the position and the velocity at each patch point to delta v commands, in order to maintain the target orbit using the feedback stabilization controller. Outputting the delta v commands via an output interface to activate the at least one thruster for the trajectory-tracking control of the vehicle.

According to another embodiment of the present disclosure, a non-transitory machine-readable medium including instructions stored thereon which, when executed by processing circuitry, configure the processing circuitry to perform operations to activate at least one thruster of a propulsion system of a vehicle for trajectory-tracking control of the vehicle. The method uses a processor connected to a memory storing executable modules, vehicle data and historical space data. Wherein the processor operates a transfer orbit generator to generate a transfer orbit for the vehicle from an initial orbit to a target orbit, and a feedback stabilization controller. The method includes computing a target orbit for the vehicle about a celestial body using space data received via an input interface. Computing a free trajectory with patch points along the free trajectory using a free trajectory module, such that each patch point includes a position and a velocity. Determining a feedback gain at each patch point along the free trajectory using a feedback gain module. Such that a state penalty function at each patch, point of the free trajectory is set to match a state uncertainty function at the same patch point. Applying the feedback gain at each patch point to map the position and the velocity at each patch point to delta v commands, in order to maintain the target orbit using the feedback stabilization controller. Outputting the delta v commands via an output interface to activate the at least one thruster for the trajectory-tracking control of the vehicle.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 4 illustrates Table 1 of 30-day trajectory tracking station-keeping cost for different choices of r, according to some embodiments of the present disclosure;

FIG. 9 illustrates Table 2 of 30-day trajectory tracking station-keeping fuel cost for different choices of N, according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art, which fall within the scope and spirit of the principles of the presently disclosed embodiments.

DETAILED DESCRIPTION

The present disclosure relates to transferring a spacecraft through multiple similar orbits, and, more particularly, to methods and systems for generating a fuel-efficient transfer among orbits in the Mars-Phobos system, that leverages multi-body dynamics on the spacecraft using a three-body assumption. In regard to the nomenclature used to explain some of the methods and systems of the present disclosure, the "Definition" Section at the end of the application provides some explanation as learned from experimentation.

Figure 1A:
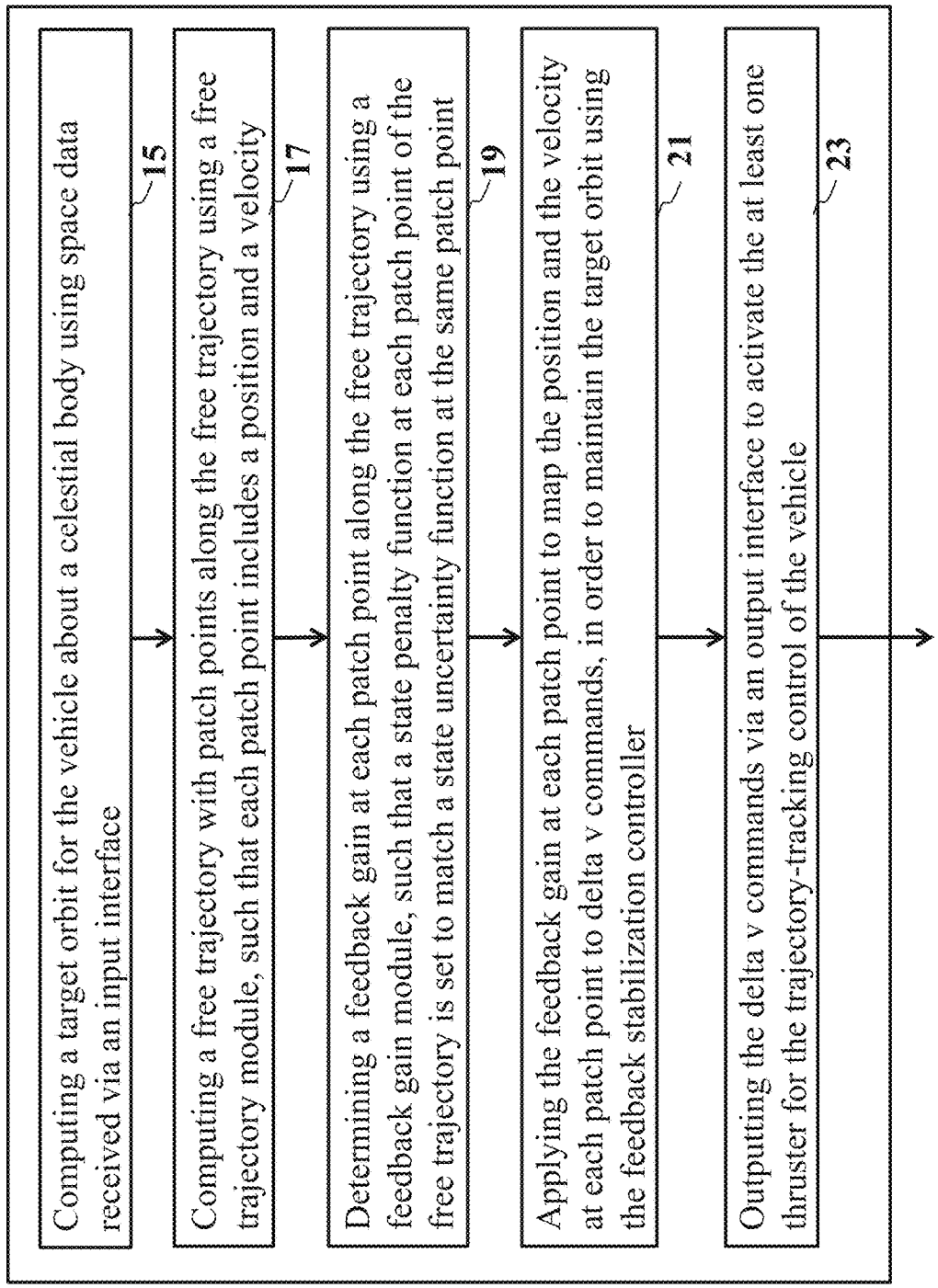
FIG. 1A is a block diagram illustrating some system and method steps for orbital design, according to an embodiment of the present disclosure.

FIG. 1A is a flow diagram illustrating some method steps for implementing a method, according to embodiments of the present disclosure. The method can be for activating at least one thruster of a propulsion system of a vehicle for trajectory-tracking control of the vehicle, the method uses a processor connected to a memory storing executable modules, vehicle data and historical space data, wherein the processor operates a transfer orbit generator to generate a transfer orbit for the vehicle from an initial orbit to a target orbit, and a feedback stabilization controller.

Step 15 of FIG. 1A includes computing a target orbit for the vehicle about a celestial body using space data received via an input interface.

Step 17 of FIG. 1A includes computing a free trajectory with patch points along the free trajectory using a free trajectory module, such that each patch point includes a position and a velocity.

Step 19 of FIG. 1A includes determining a feedback gain at each patch point along the free trajectory using a feedback gain module, such that a state penalty function at each patch point of the free trajectory is set to match a state uncertainty function at the same patch point.

Step 21 of FIG. 1A includes applying the feedback gain at each patch point to map the position and the velocity at each patch point to delta v commands, in order to maintain the target orbit using the feedback stabilization controller.

Step 23 of FIG. 1A includes outputting the delta v commands via an output interface to activate the at least one thruster for the trajectory-tracking control of the vehicle.

Embodiments of the present disclosure provide important solutions to orbital designs to the Mars-Phobos system, by non-limiting example, Space technological innovators in the Space Industry see missions to Phobos as important technological interests due to Phobos's low gravity, which is seen as a good opportunity for testing and proving technologies required for an eventual sample return mission to Mars. In addition, future space innovations and missions to Phobos are view as important for many countries planning missions to the Mars-Phobos system, i.e. including a discovery class mission proposed to place an orbiter in Mars orbit by 2021 to study Phobos and Deimos through a series of close flybys, i.e. a mission called Phobos and Deimos & Mars Environment (PADME). Two other Phobos missions are proposed for the Discovery 13 selection including a mission called Merlin, which would flyby Deimos but actually orbit and land on Phobos, and another one is Pandora, which would orbit both Deimos and Phobos. In addition, a Japanese Aerospace Exploration Agency (JAXA) unveiled a Martian Moons Exploration (MMX), a sample return mission targeting Phobos. MMX will land and collect samples from Phobos multiple times, along with conducting Deimos flyby observations and monitoring Mars's climate. By using a corer sampling mechanism, the spacecraft aims to retrieve samples. NASA, ESA, DLR, and CNES are also participating in the project, and will provide scientific instruments. The U.S. will contribute a Neutron and Gamma-Ray Spectrometer (NGRS), and France the Near IR Spectrometer (NIRS4/MacrOmega).

Figure 1B:
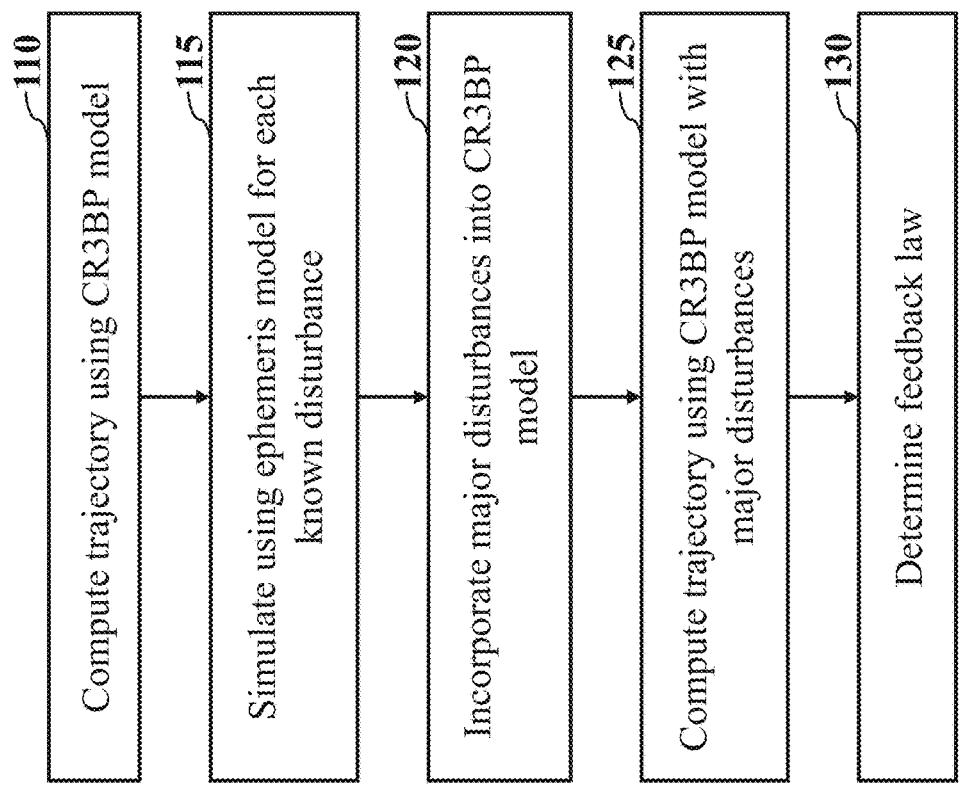
FIG. 1B is a flow diagram illustrating some method steps for implementing some embodiments, according to some embodiments of the present disclosure.

FIG. 1B is a flow diagram illustrating some method steps for implementing some embodiments, according to some embodiments of the present disclosure. For example, step 110 of FIG. 1B computes the trajectory using the CR3BP model. Step 115 discloses simulating using ephemeris model for each known disturbance. Step 120 includes incorporating the major disturbances into CR3BP model. Step 125 computes the trajectory using the CR3BP model with the major disturbances. Finally, step 130 determines the feedback law, such that the determined feedback gain is used to obtain the corresponding feedback control law. Wherein the free trajectory module uses a dominant disturbance source module for determining dominant sources of disturbances above a predetermined threshold, to assist in computing the free trajectory.

Figure 1C:
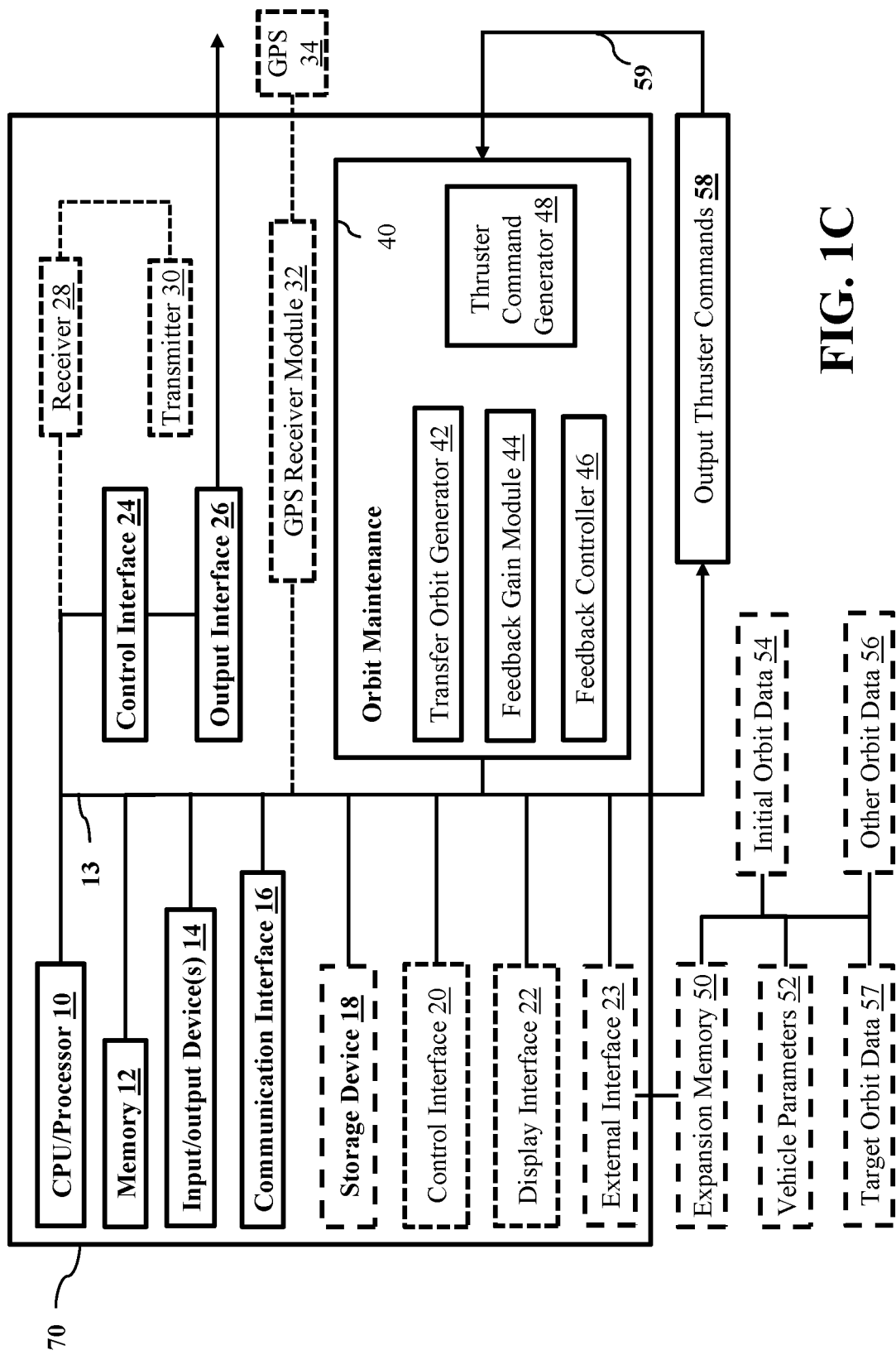
FIG. 1C is a block diagram illustrating some components used for implementing the methods and systems, according to some embodiments of the present disclosure.

FIG. 1C is a block diagram illustrating some components that can be used for implementing the systems and methods, according to embodiments of the present disclosure. For example, a computer system 70 or network can be adapted for use in determining a transfer orbit for moving a spacecraft or vehicle from an initial orbit about a celestial body (e.g., the Mars or the like) into a target orbit about the celestial body or another celestial body. A CPU or processor (s) 10 can be connected via a bus system 13 to a memory 12, input/output devices 14 and a communication interface 16. Also connected to the bus system 13 can be a storage device 18, a control interface 20, display interface 22, and an external interface 23. The external interface 23 can be connected to an expansion memory 50, vehicle parameters 52 (i.e. spacecraft specifications, thruster specifications, size, weight, etc.), initial orbit data 54 (i.e. time, date, parameters including altitude, inclination, eccentricity, etc.) and other orbit data 56 (i.e. unique orbit data). The bus system 13 can also connect a control interface 24, output interface 26, receiver 28 and transmitter 30. Further, the bus system can connect a GPS receiver module 32 to a GPS 34.

The bus system 13 can connect an orbit maintenance 40 that can include a transfer orbit generator 42, a feedback gain module 44, a feedback controller 46 and a thruster command generator 48. In addition, the bus system 13 can connect an output thruster command module 58 to output the thruster commands. Wherein bus 59 connect back to the Orbit Maintenance to communicate data from a thrusters Controller Module (not shown, see FIG. 12A).

FIG. 1C illustrates a system and method for activating at least one thruster of a propulsion system of a vehicle for trajectory-tracking control of the vehicle. The computer 70 can be a server or a desktop, a laptop, a mobile or other computer device or system with one or more processors 10. The processor 10 may be a central processing unit adapted for accessing code in the form of a transfer orbit generator 42 in a memory 12 or storage data 18 of the computer 70 (or in a expansion memory 50 or other data storage 52, 54, 56. Contemplated are external storage devices if further required depending upon the specific design and aspect of an intended hardware and goal implementation, according aspects related to systems and methods of the present disclosure. For example, the computer 70 can be used to implement the steps of the systems and methods, where the memory 12, and/or storage device 18 can store data.

Referring to FIG. 1A, FIG. 1B and FIG. 1C, the stored data in the memory 12 of FIG. 1C can include the executable modules, vehicle data and historical space data. For example, the vehicle data can include specifications of the spacecraft, dimensions, weight, performance data under varied conditions including gravitation forces, and other perturbations, i.e. complex motion(s) of a massive body subject to forces other than the gravitational attraction of a single other massive body in space. Further, the vehicle data can include data related to aspects related to vehicle dynamics associated with one or more of the multi-variables, i.e. (1) unusual orbital characteristics of Phobos; (2) unusual orbital motion of Phobos; (3) Phobos's unusually close orbit around Mars; and (4) other known perturbations. The space data can include data related to the Mars-Phobos system, past missions to Mars and any other data related to space, the spacecraft and planning orbital designs to Mars or other celestial bodies in the universe. For example, stored as space data can include data about the moons of Mars, such as characteristics of Phobos that can be taken into consideration in developing orbital designs from an initial Phobos orbit to a similar target Phobos orbit. Such data review may include that Phobos orbits have an altitude of 5,989 km (3,721 mi), such that Phobos orbits Mars below the synchronous orbit radius, meaning that it moves around Mars faster than Mars itself rotates. Therefore, from the point of view of an observer on the surface of Mars, it rises in the west, moves comparatively rapidly across the sky (in 4 h 15 min or less) and sets in the east, approximately twice each Martian day (every 11 h 6 min).

Optionally, the stored data can be stored in the storage device 18, the external interface 22, that is connected an expansion memory 50 that connects to an initial orbit data database 54, other orbit data database 56 and vehicle parameters, specifications, performance, etc. data database 52, of FIG. 1C.

Still referring to FIG. 1A, FIG. 1B and FIG. 1C, the processor 10 of the computer 70 of FIG. 1C may be two or more processors depending upon the specific application. For example, some steps may require a separate processor to ensure a specific processing time or processing speed associated with the systems and methods of the present disclosure.

The receiver 28 or input interface of FIG. 1C can receive space data that may be up-to-date space data, obtained from either an Earth Mission Control Center or sensors associated with the spacecraft, or some other location, after the stored historical space data stored in the memory 12 of FIG. 1C. The receiver 28 and transmitter 30 of FIG. 1C can provide a wireless venue for receiving and sending data to, for example, to an Earth Mission Control Center, or some other destination. A GPS receiver module 32 connected to a GPS 34 of FIG. 1C can be used for navigation related aspects. The computer 70 of FIG. 1C can include a control interface 20, display interface 22, and optionally external devices, control interfaces, displays, sensors, machines, etc., (not shown, see FIG. 12B), that are contemplated for uses related to the systems and methods of the present disclosure.

The processor 10 of FIG. 1C can operate or implement aspects of the orbit Maintenance 40 including a transfer orbit generator 42 to generate a transfer orbit for the vehicle from an initial Phobos orbit to a target Phobos orbit, along with operating a feedback stabilization controller 46 or feedback controller.

In regard to step 17A of FIG. 1A, and steps 110 to step 125 of FIG. 1B, the processor 10 of FIG. 1C can compute a free trajectory with patch points along the free trajectory using a free trajectory module, i.e. stored in the memory 12, such that each patch point includes a position and a velocity. In particular, steps 110 to step 125 of FIG. 1B disclose computing a trajectory using a circular restricted three-body problem (CR3BP) model that identifies solutions to the CR3BP. The CR3BP can provide a better approximation of spacecraft motion, as they consider the spacecraft motion subject to gravitational forces in a sun-planet or planet-moon system, where both bodies are assumed moving in a circular path about the barycenter.

In regard to step 19A of FIG. 1A, the processor 10 of FIG. 1C can determine a feedback gain at each patch point along the free trajectory using a feedback gain module 44 of FIG. 1C, such that a state penalty function at each patch point of the free trajectory is set to match a state uncertainty function at the same patch point.

In regard to step 130 of FIG. 1B, the processor 10 of FIG. 1C uses the determined feedback gain to obtain a corresponding feedback control law, such that the free trajectory module uses a dominant disturbance source module for determining dominant sources of disturbances above a predetermined threshold, to assist in computing the free trajectory.

In regard to step 21A of FIG. 1A, the processor 10 of FIG. 1C can apply the determined feedback gain at each patch point to map the position and the velocity at each patch point to delta v commands, in order for the spacecraft to maintain the target Phobos orbit using, in part, the feedback stabilization controller 46 of FIG. 1C.

Figure 12A:
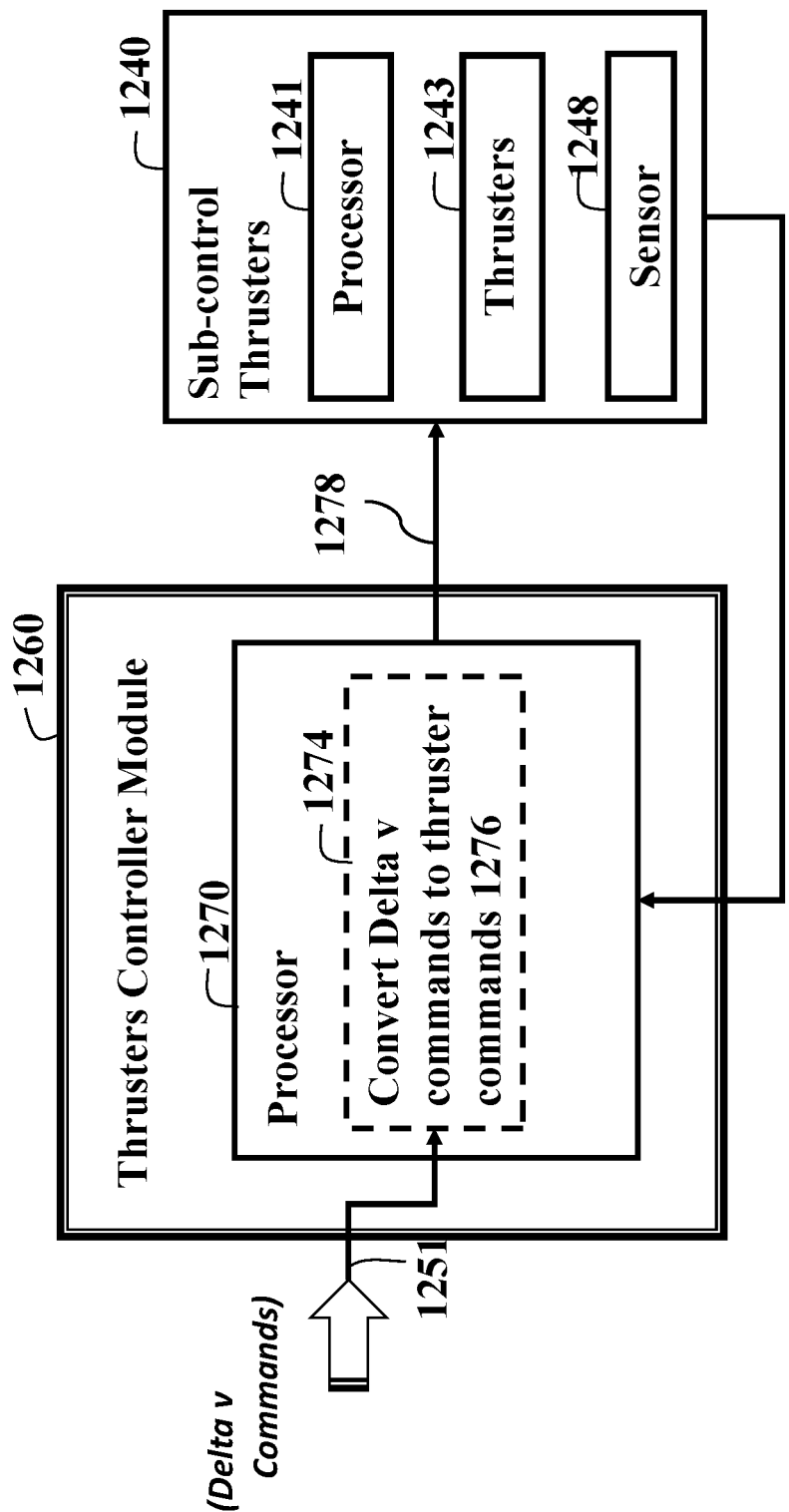
FIG. 12A is a block diagram illustrating some components for implementing the generated transfor orbit, according to an embodiment of the present disclosure.

In regard to step 23A of FIG. 1A and FIG. 12A, the processor 10 of FIG. 1C can access the thruster command generator connected to a thruster command module 1210 of FIG. 12A to receive the delta v commands 1201 of FIG. 12A, convert the delta v commands to thruster commands, such that the thruster command module 1210 sends the thruster commands to a sub-controller thrusters that includes a processor 1241, where the processor 1241 can processes the thruster commands, so the thruster commands can activate the at least one thruster for trajectory-tracking control of the vehicle, according to the converted delta v commands. Other implementing configurations are contemplated for receiving the delta v commands, converting the delta v commands to thruster commands, processing the thruster commands according to the at least one thruster, and implementing the thruster commands to activate the at least one processor.

Also contemplated is that an operation of the orbit maintenance 40 can utilize the transfer orbit generator 42, the feedback gain module 44, feedback controller 46, along with other executable modules or software programs, if needed, to result in generation or production of delta v commands, as at least one final or at least one output orbital design that can assist in defining the transfer trajectory for a spacecraft (as may be defined by spacecraft parameters 52) from an initial or first Phobos orbit (as may be defined by initial orbit data 54) to a target or second/final Phobos orbit (as may be defined by target orbit data 57). To this end, the transfer orbit may include control data for use in controlling operation of the propulsion system of the spacecraft (or its launch vehicle) such as information for transferring Phobos orbits that may include time, magnitude, and direction of each activation of one or more thrusters, with time defining a location on the Phobos orbits.

The transfer orbit and information may be stored in memory 12 for later retrieval or may be communicated to (or otherwise provided to) a requestor such as over a network such as the Internet to a requesting device (e.g., another computer device capable of processing digital data). Likewise, the initial orbit data 54, the spacecraft parameters 52, and the target orbit data 57 may be retrieved from the memory 12 or storage data 18 accessible (via a network or the like) by computer 70 or may be communicated in a wired or wireless manner over a digital communications network from a requesting device (e.g., a requestor's computer such as a mission designer or similar client's communication device that accesses the computer 70 to request the transfer orbit data.

Orbital design information may include (but is not limited to) the magnitudes and directions required to depart an initial Phobos orbit, to perform required trajectory aspects, and to arrive at the target Phobos orbit. The position, velocity, and location information can be used to track spacecraft performance, to confirm trajectory performance, and to model the requirements of the spacecraft sub-systems (e.g. communications). In addition, the procedure that is used to generate these orbit transfers may vary in its sequence, may not include every step, and/or may include additional steps depending on the precise orbit transfer being generated. For instance, given a good initial guess or estimate (which may be entered manually through a GUI or be selected from a set of previously generated transfer Phobos orbits and stored in the memory.

Figure 2:
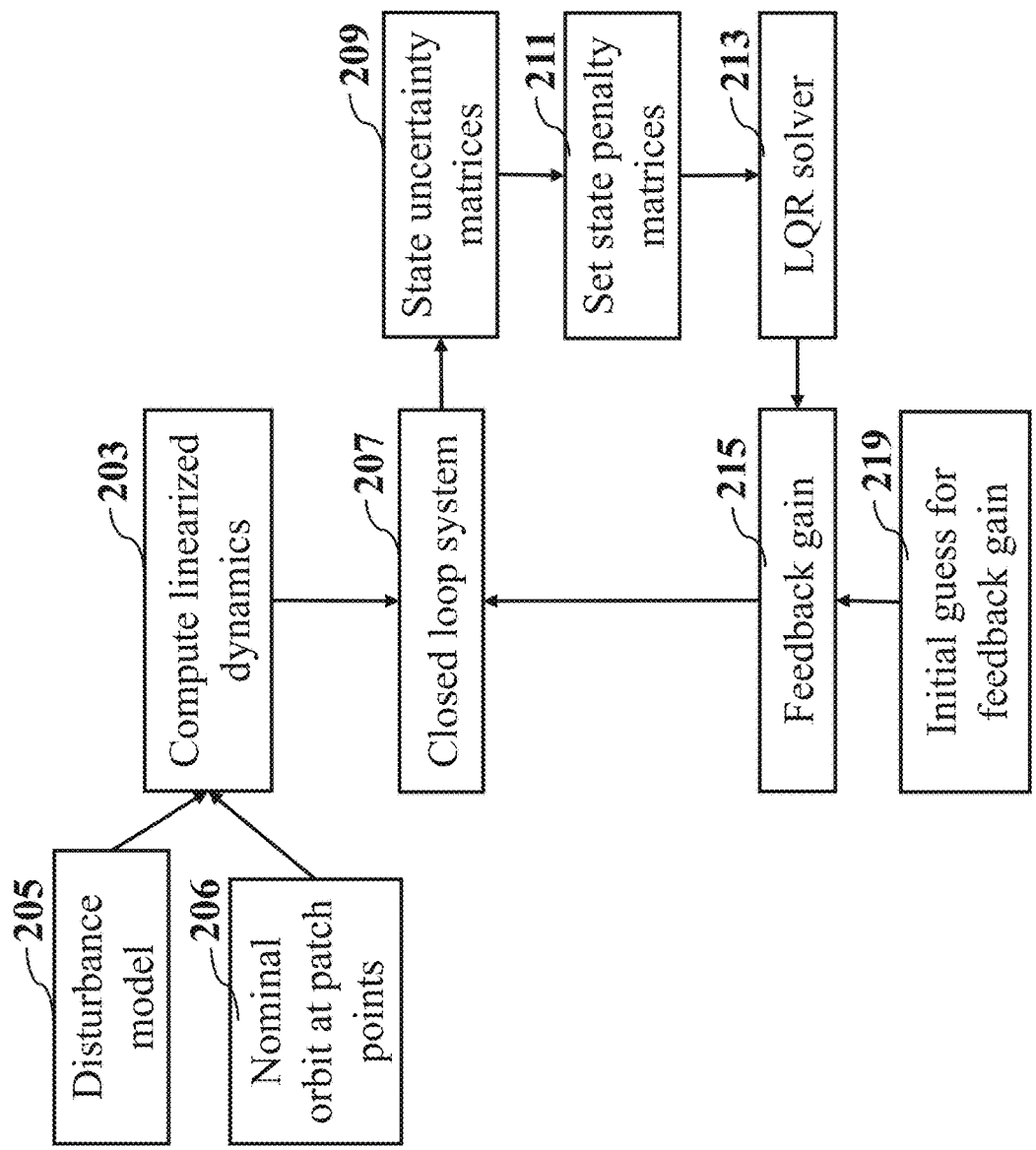
FIG. 2 is a flow diagram illustrating determining of a stabilizing feedback gain for tracking the norminal orbit, according to some embodiments of the present disclosure.

FIG. 2 is a flow diagram illustrating determining of a stabilizing feedback gain for tracking the norminal orbit, according to some embodiments of the present disclosure. For example, given the model that includes all major disturbances 205 and an orbit satisfying the dynamics of that model 206, we compute linearized dynamics 203 about the patch points of the orbit. The linearized dynamics 203 are used in conjunction with a feedback gain 215 to form a closed-loop system 207. The initial guess to the feedback gain 219 is provided and set to 0. When propagated forwards-in-time, the closed-loop system provides the evolution of the state uncertainty matrix 209. We set the state penalty matrix to equal the state uncertainty matrix 211. The state penalty matrix is passed to an LQR solver 213 to determine a new feedback gain 215. This is done in a loop until the change in feedback gain is below a certain threshold.

Quasi-Satellite Orbit Around Phobos

Solutions to the two-body problem are conic sections representing a spacecraft's path around one gravitational body. Once the spacecraft motion is significantly away from the primary gravitational body, its motion is influenced by the gravitation of other gravitational bodies. In the case of the Martian system, when the spacecraft is close enough to the moon Phobos, the next significant source of gravitation is Phobos. Solutions to the circular restricted three-body problem (CR3BP) are a better approximation of spacecraft motion, as they consider the spacecraft motion subject to gravitational forces in a sun-planet or planet-moon system, where both bodies are assumed to be moving in a circular path about the barycenter.

In this work, we consider the Mars-Phobos system, which has a mass ratio of $\mu=1.6606\ 10^{-8}$, meaning that the mass of Phobos is a fraction $\mu$ of the Mars-Phobos system. The equations of motion for this system are given by, $$\ddot{x} - 2\dot{y} - x = -\frac{1-\mu}{r_{13}^3}(x+\mu) - \frac{\mu}{r_{23}^3}(x-1+\mu), \quad (1a)$$

$$\ddot{y} + 2\dot{x} - y = -\frac{1-\mu}{r_{13}^3}y - \frac{\mu}{r_{23}^3}y, \quad (1b)$$

$$\ddot{z} = -\frac{1-\mu}{r_{13}^3}z - \frac{\mu}{r_{23}^3}z, \quad (1c)$$

where $$r_{13} = \sqrt{(x+\mu)^2 + y^2 + z^2},$$

$$r_{23} = \sqrt{(x+1-\mu)^2 + y^2 + z^2};$$

where $$r_{13} = \sqrt{(x+\mu)^2+y^2+z^2},$$

$$r_{23} = \sqrt{(x+1-\mu)^2+y^2+z^2};$$

In addition, x, y, z are defined in the rotating coordinate system centered at the barycenter of the planet-moon system as non-dimensionalized, normalized quantities. The x-axis points in the direction of Phobos, the z-axis points in the direction of the angular momentum of system around its barycenter, and the y-axis completes the right hand coordinate system. An energy-like constant of integration that exists in the CR3BP is called the Jacobi constant C, which is given by, $$C = \frac{2(1-\mu)}{r_{13}} + \frac{2\mu}{r_{23}} + (x^2+y^2) - (\dot{x}^2+\dot{y}^2+\dot{z}^2). \quad (2)$$

Limit-cycle solutions to (1a) to (1c) are termed orbits, for which there exist numerous families. Within the Sun-Earth and the Earth-Moon systems, the class of orbits that are typically preferred are the Lyapunov and halo orbits due to the proximity to the secondary body as well as their stability properties and structures that make it suitable for conducting scientific experiments and making observations of the secondary body. While these two types of orbits do exist in the Mars-Phobos system, a majority of them pass through the surface of Phobos, making them infeasible for a sufficiently long-term mission. Alternatively, in the same system, there exist close-to-stable; planar orbits called distant retrograde orbits (DROs) and these keep the spacecraft at a relatively far distance from Phobos. These orbits are planar and therefore not ideal candidates for missions seeking to observe the entire surface of the moon. However, three-dimensional, quasi-periodic structures, called quasi-satellite orbits (QSOs), exist in the neighborhoods of DROs and these have been explored as candidate trajectories for potential missions. In this work, we consider such an orbit of approximate dimension 100 km-by-200 km-by-60 km, which is an orbit that provides good coverage of Phobos while remaining sufficiently far from the moon, with a time period that is approximately equal to the time period of Phobos orbiting around Mars.

Orbit Determination

Figure 3:
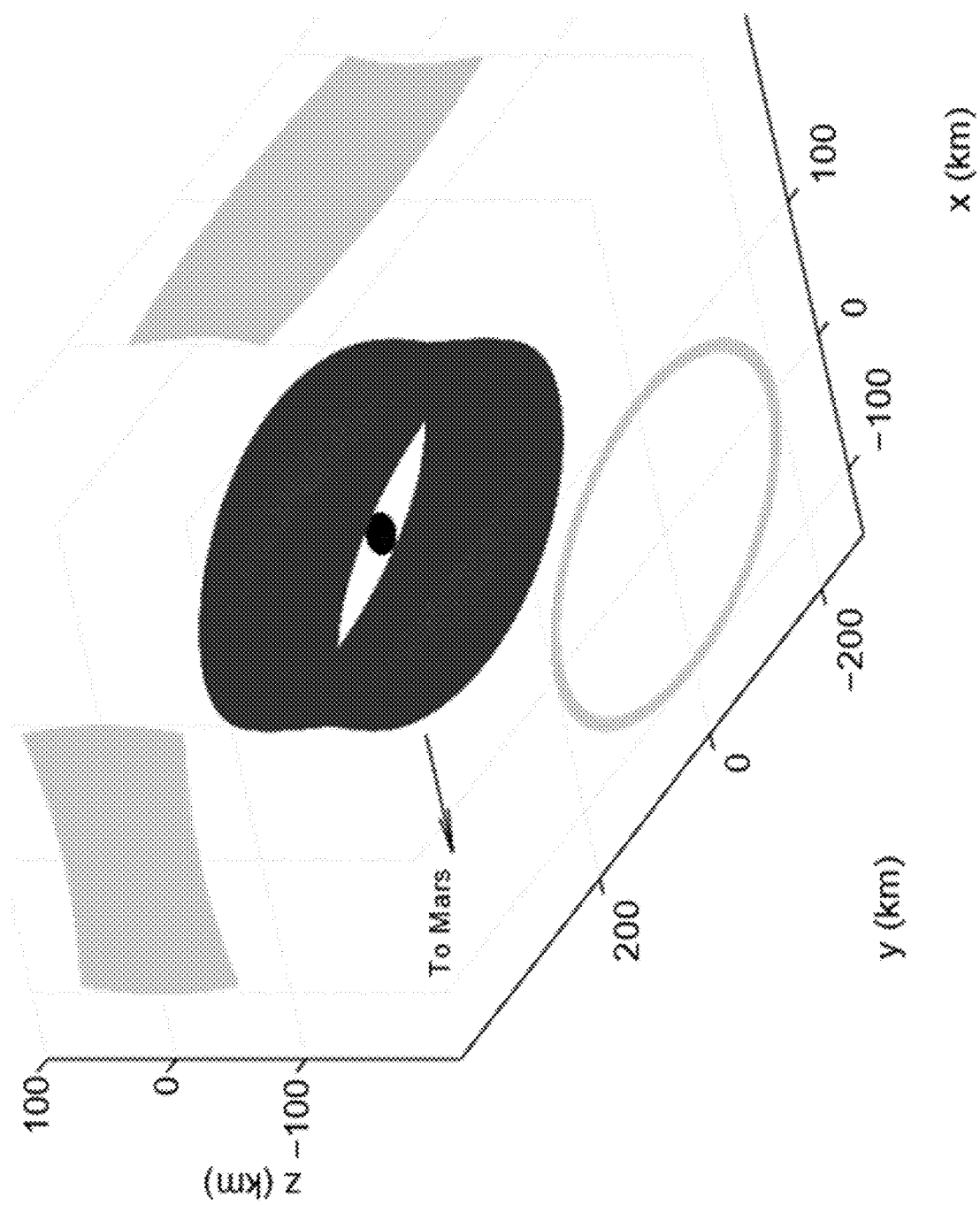
FIG. 3 illustrates a graph of quasi-satellite orbit (QSO) of size 100 km×200 km×60 km; the trajectory moves in the clockwise direction when viewed in the x-y plane, according to some embodiments of the present disclosure.

FIG. 3 illustrates a graph of quasi-satellite orbit (QSO) of size 100 km×200 km×60 km; the trajectory moves in the clockwise direction when viewed in the x-y plane, according to some embodiments of the present disclosure. For example, the determination of the QSO is performed by modifying a DRO. It is difficult to directly construct a QSO and, therefore, we begin by following the computational procedure to generate a family of DRO orbits with approximate dimension of 100 km-by-200 km in the x-y plane. These DROs are stacked on top of each other sequentially in time, with each revolution discretized into 4 patch points. The multiple-shooting continuation scheme described by Muralidharan (V. Muralidharan, "Orbit Maintenance Strategies for Sun-Earth/Moon Libration Point Missions: Parameter Selection for Target Point and Cauchy-Green Tensor Approaches," Master's thesis, Purdue University, West Lafayette, Ind., 2017), the contents of which are incorporated herein in its entirety, is then implemented with the additional constraint of a fixed z-coordinate of the first patch point, resulting in a continuous, free trajectory. The solution is then used as an initial guess to a new multiple-shooting problem, with higher target z-amplitude, and this is repeated until the z-coordinate of the first patch point is equal to the desired 60 km. The result is the orbit shown in FIG. 3.

This QSO trajectory obtained is free under the assumptions of the CR3BP. However, due to the existence of disturbance forces from the eccentric orbit of Phobos around Mars, the oblation effects of both bodies, and the gravitational pull of other bodies in the solar system, such as the Sun and Jupiter, the trajectory is not free in reality. To compute the true free trajectory, we use a high-fidelity ephemeris models mar097 and de421 to propagate the dynamics. We use the solution from the previous step, discretized at 4 patch points per revolution, as an initial guess to a new multiple-shooting scheme that gives a continuous, and truly free, trajectory.

Station-Keeping

Although the orbit is free, system disturbances can be expected to cause deviations of the spacecraft from the desired path. For this reason, we must implement station-keeping schemes that ensure we remain close to the desired trajectory. In this section, we introduce two such schemes for comparison: a trajectory-tracking scheme, which ensures close tracking, and a manifold-stabilization scheme that guarantees that the satellite remain in the neighborhood of the desired orbit.

Trajectory-Tracking: In the neighborhood of the trajectory, we can approximately model the dominant dynamics with the time-varying linear system, $$\delta x_{k+1} = A_k \delta x_k + B_k \Delta v_k, \quad (3)$$

where $\delta x_k = x(t_k) - x_0(t_k)$, being the six dimensional actual state and $x_0(t_k)$ being the reference state measured at the discretization time-step to, and $t_k$, and $\Delta v_k$ being the three-dimensional vector of an impulsive maneuver, i.e., instantaneous velocity change at $t_k$. To maintain orbit, we minimize the cost functional, $$\delta x_N^T P_N \delta x_N + \sum_{k=0}^{N-1} \delta x_k^T Q_k \delta x_k + \Delta v_k^T R_k \Delta v_k, \quad (4)$$

over the mission duration $[t_0, t_N]$. The solution to this LQR problem is given, $$\Delta v_k = -K_k \delta x_k \quad (5)$$

where Kk is the time-dependent gain matrix that satisfies, $$K_k = (R_k + B_k^T P_{k+1} B_k)^{-1} B_k^T P_{k+1} A_k, \quad (6)$$

and $P_k$ satisfies the discrete algebraic Riccati equation, $$P_k = Q_k + A_k^T P_{k+1} A_k - A_k^T P_{k+1} B_k K_k, \quad (7)$$

The choice of penalty matrices $P_N$, $Q_k$, and $R_k$ should be made judiciously. To do this, we being by noting that, since the orbit computation is based on highly accurate data, the major source of disturbance is the noisy readings of the spacecraft position and velocity. We also present the covariance of this measurement error at time $t_k$, $$W_k = \mathbb{E}\left[(\hat{x}(t_k) - x(t_k))(\hat{x}(t_k) - x(t_k))^T\right].$$

where $\hat{x}(t_k)$ is the state measurement. We are interested in the error with respect to the desired trajectory, whose a posteriori covariance is given by, $$S_k = \mathbb{E}\left[(\hat{x}(t_k) - x_0(t_k))(\hat{x}(t_k) - x_0(t_k))^T\right], =$$

$$W_k + \mathbb{E}\left[(x(t_k) - x_0(t_k))(x(t_k) - x_0((t_k))^T\right],$$

under the assumption that the trajectory-tracking and measurement errors are uncorrelated, which is true if and only if their initial errors are uncorrelated. The predicted, a priori covariance evolves according to the closed-loop system dynamics, $$S_{k+1} = \hat{A}_k S_k \hat{A}_k^T + W_{k+1}, \quad (8)$$

for k=0, ..., N-1, where $\hat{A}_k = A_k - B_k K_k$.

Since we wish that the spacecraft track the trajectory as closely as possible, we set $Q_k = S_k$ for all k. This is true because $S_k$ is a measure of our confidence in our estimate; the higher the confidence, the less we need to penalize that particular state. Since there is no preferred thruster direction, the penalty on control is chosen to be constant and equal in all directions, giving $R_k \equiv rI_3$ for some r>0. Since we are interested in low-energy solutions, we set r to be a very large number. However, we note that r cannot be too large, as this would eventually cause poor enough tracking of the trajectory to invalidate the assumption of linearity, causing the satellite to drift off into space. Our choice of r is informed through simulation.

We solve (6)-(8) for the optimal control gain $K_k$. To find a solution, we note that (7) is stable backwards in time with required final condition $P_N$, while (8) is stable forwards in time with required initial condition $S_0$. We find the solution by initially setting $P_k = S_k \equiv S_0$ and propagating (8) forwards and (7) backwards until converging to a solution, setting $Q_k = S_k$ for k=0, ..., N-1 and $P_N = S_N$ every time after completing the forward pass. Note that $S_0$ is an a posteriori covariance and may be the output of a filter, or solely due to error inherent in the device used for measurement.

Neighborhood station-keeping: Since it is not a mission requirement that the spacecraft precisely follow a prescribed orbital trajectory, we introduce a method that ensures the satellite stay near Phobos but not at a specific location along a desired orbit. Loosening the tracking constraint allows us to reduce a significant amount of fuel while still allowing close flybys of the moon. In particular, our scheme is based on the realization that a family of orbits with the same Jacobi constant have distances from the secondary body that, while not the same across the family, do not deviate greatly from one another. For this reason, instead of tracking a prescribed trajectory, we impose the tracking of this energy constant.

Let $C_d$ be the Jacobi constant of the QSO trajectory obtained in the CR3BP. It has been shown that the Jacobi constants of orbits computed in the CR3BP and extended to more general assumptions are related to each other and evolve on a shared manifold. Therefore, a spacecraft that deviates from the reference path can be returned to a similar orbit in the neighborhood of the original orbit.

The approach we propose is a receding horizon controller that determines the predicted sequence of $\Delta v_{i|k}$ that ensures the spacecraft will track a new trajectory that is close to the nominal and that converges at the end of the time-horizon to the desired Jacobi constant $C_d$. The control is determined by solving an optimal control problem over the finite-time horizon N, $$\min_{\Delta v_{i|k}, T_{i|k}} \alpha \sum_{i=0}^{N-1} \xi_i \|\Delta v_{i|k}\| + (1-\alpha)\left(\|r_{i|k}\|_{W_r}^2 + \|v_{i|k}\|_{W_v}^2\right), \quad (9a)$$

$$\text{sub, to } t_{0|k} = 0, \quad (9b)$$

$$\Delta v_{i|k} = \Delta v(T_{i|k}), i = 0, \ldots, N-1, \quad (9c)$$

$$C_{N|k} = C_d. \quad (9d)$$

and setting the control, $$\Delta v_k = \Delta v_{0|k}, \quad (10)$$

for a time duration of $T_{1|k}$, where $r_{i|k}$ and $v_{i|k}$ are the position and velocity state, resp., at time $t_{k+i}$ computationally determined at time $t_k$; similarly, $\Delta v_{i|k}$ is the value of $\Delta v_{k+i}$, computationally determined at time $t_k$; $\alpha$, $\xi_i$, $W_r$, $W_v$ are weighting constants, and $C_{N|k}$ is the Jacobi constant at the end of the time horizon, computationally determined at time $t_k$.

Due to the complexity of space dynamics, and being cognizant of the fact that terminal equality constraints can cause stability problems, we cannot ensure stability of our approach without severely limiting fuel savings; therefore we take N to be sufficiently large to be confident in being able to predict any large exogenous forces that would affect system stability. Furthermore, we have introduced the weight α for this same purpose, to tradeoff between optimizing fuel consumption (α=1) and tracking the nominal trajectory (α<1), expecting that good trajectory tracking would ensure stable behavior.

We solve (9) for $\Delta v_k$, using the interior point optimization solver IPOPT. In particular, our algorithm is implemented by connecting the trajectory at patch-points $t_{1|k}, \ldots, t_{n-1|k}$ corresponding to indexes i=1, . . . , n−1, respectively. Since gradients of the cost functional as well as the Jacobian of the constraint vector are functions of the state transition matrix propagated between two intermediate patch points, we are able to provide user-defined objective gradients and constraint-Jacobians to boost the performance of the optimization algorithm.

Experiments

In this section, we present results of numerical simulations that test our station-keeping schemes. Each simulation consisted of Monte Carlo runs, for which we computed the mean and standard deviation of fuel consumption. In simulation, position measurement uncertainties are assumed to be unbiased with a standard deviation σ=0.1 km in all three directions; velocity measurement uncertainties are also unbiased and have standard deviation σ=1 cm/s, giving $W_k \equiv$ diag (0.1, 0.1, 0.1, 1, 1.1). We perform maneuvers at a rate of one every 7.6 hours, which corresponds to about one maneuver per revolution. This has been done because performing more than or less than one maneuver during the same orbit has not shown any improvement in tests under similar conditions. Maneuvers spaced too far from each other may increase the overall station-keeping cost as it allows ample time for the spacecraft to deviate from the baseline trajectory.

FIG. 4 illustrates Table 1 of 30-day trajectory tracking station-keeping cost for different choices of r, according to some embodiments of the present disclosure.

Figure 5:
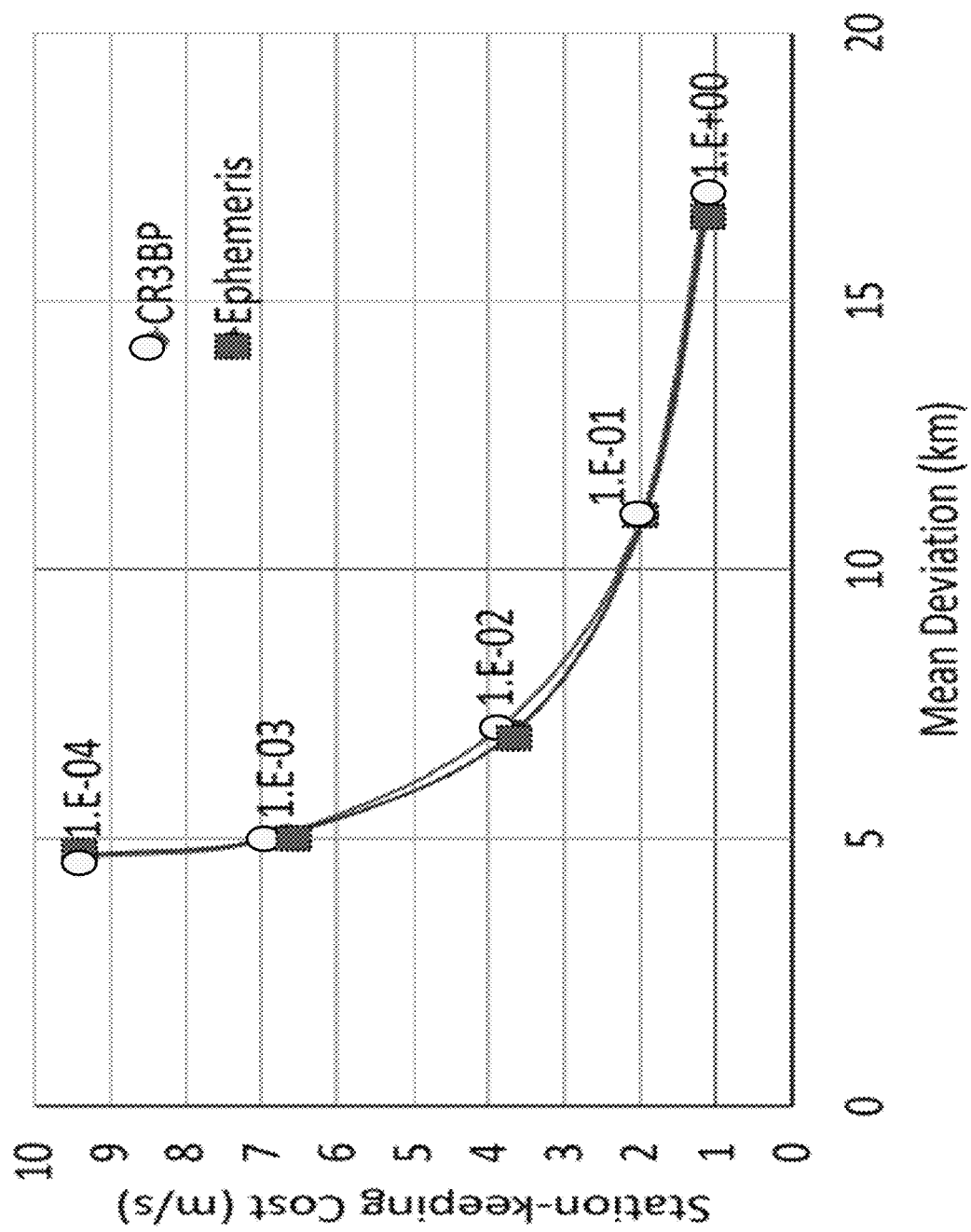
FIG. 5 illustrates a graph of a 30-day trajectory tracking station-keeping cost plotted against mean deviation, according to some embodiments of the present disclosure.

FIG. 5 illustrates a graph of a 30-day trajectory tracking station-keeping cost plotted against mean deviation, according to some embodiments of the present disclosure.

Figure 6A:
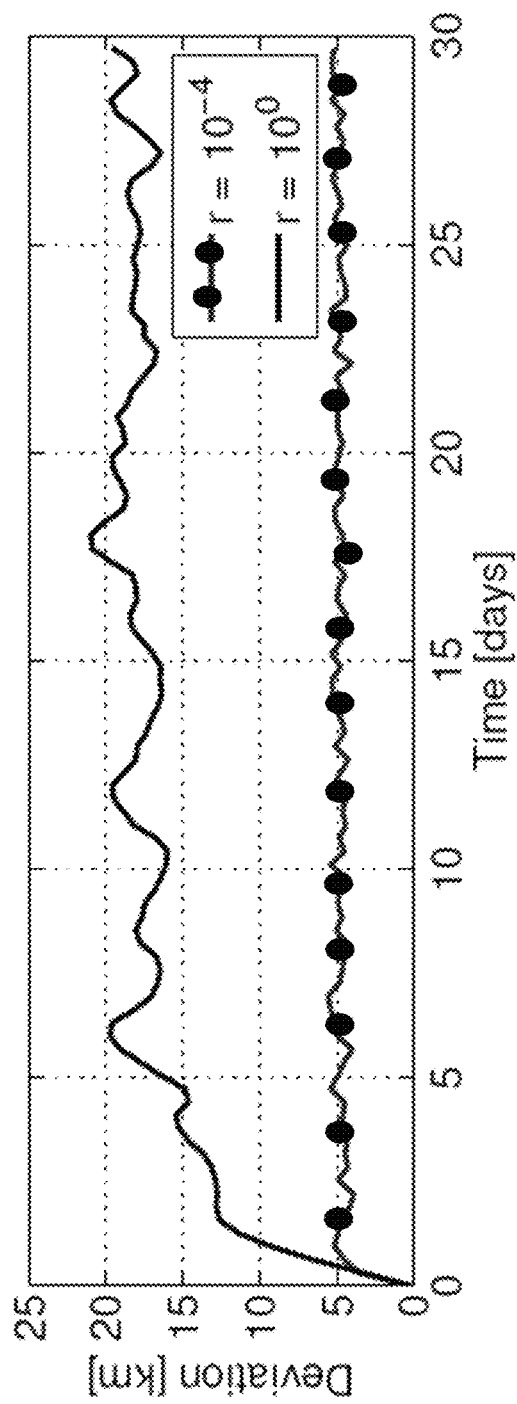
FIG. 6A and FIG. 6B illustrates graphs of plotted trajectories tracking mean deviation (FIG. 6A) and station-keeping cost (FIG. 6B) plotted for r=10−4 (with dots on the line) and r=100 (with no dots on the line), according to some embodiments of the present disclosure.
Figure 6B:
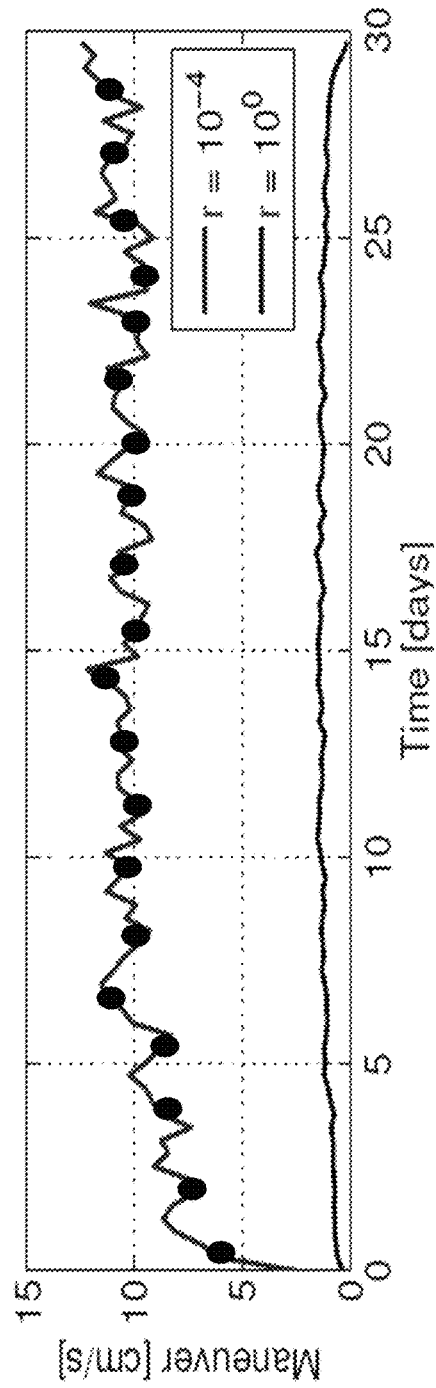

FIG. 6A and FIG. 6B illustrates graphs of plotted trajectories tracking mean deviation (FIG. 6A) and station-keeping cost (FIG. 6B) plotted for r=10−4 (with dots on the line) and r=100 (with no dots on the line), according to some embodiments of the present disclosure.

Referring to FIG. 4 (Table 1), FIG. 5, FIG. 6A and FIG. 6B, first considered is the trajectory-tracking method, where the penalty matrix is chosen to be $R_k = rI_3$. Performed is a test of different choices of r, running Monte Carlo simulations consisting of 100 runs each, and provide the results in FIG. 4 (Table 1), FIG. 5, FIG. 6A and FIG. 6B, which correspond to both the CR3BP model dynamics and the more precise ephemeris model. FIG. 5 shows the relationship between station-keeping cost and the mean deviation computed for a one-month mission duration around the reference orbit for different choices of r. The results show that, when r≤$10^{-3}$, the spacecraft maintains a tight adherence to the reference trajectory but consumes a large amount of fuel while, when r≥$10^0$, the fuel consumption is at least 5 times better while the tracking is very poor, eventually resulting in the spacecraft losing track of the reference trajectory. Note that the difference in results obtained by the CR3BP and ephemeris models is small, which signifies a consistency between the two.

Neighborhood Station-Keeping

We now consider the alternative, neighborhood station-keeping scheme. This scheme, unlike the other technique, uses a full, nonlinear model to determine maneuvers. The use of nonlinear dynamics increases the computational burden, which can be managed by choice of the time horizon N. To keep the computation reasonably fast, and in order to able to simulate one month of station-keeping in less than one day on an ordinary desktop computer, we performed some numerical experiments and chose a bound N≤5, roughly corresponding to a length of 5 orbits, or a little more than 1.5 days. To achieve lower fuel consumption, we front-loaded the cost on the initial control inputs; instead of using a decaying cost of the form $\Sigma k+1 = \gamma \xi_k$ for some positive γ<1, we simply set $\xi_0 = 10$ and $\xi k = 1$ for all other k. The higher $\xi 0$ increases the cost of the first maneuver; a lower one improves tracking but increases fuel cost.

Figure 7:
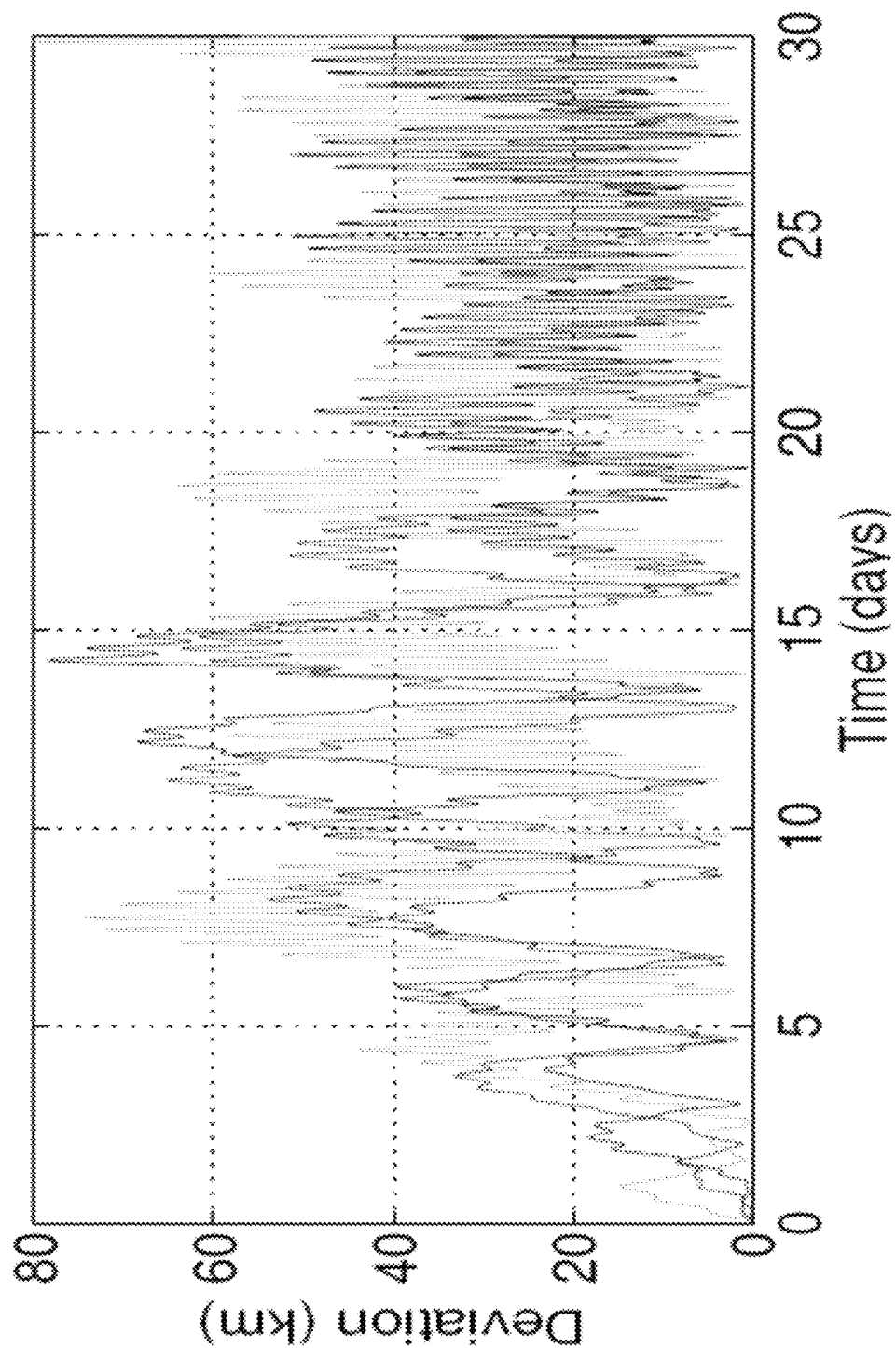
FIG. 7 illustrates a graph of the deviation from baseline trajectory for three separately, randomized runs corresponding to neighborhood station-keeping $\alpha=1$, according to some embodiment of the present disclosure.

FIG. 7 illustrates a graph of the deviation from baseline trajectory for three separately (colored), randomized runs corresponding to neighborhood station-keeping α=1, according to some embodiment of the present disclosure. For example, using the CR3BP model, is performed three sets of Monte Carlo simulations consisting of 20 runs each, corresponding to α=0, 0.5 and 1, results of which are tabulated in Table 2. The minimum-fuel solution, corresponding to α=1, had a fuel cost below the minimum fuel cost achieved using the trajectory-tracking technique. This improved value was obtained at the price of loosened station-keeping, as shown in FIG. 7, which exhibits the mean deviation of the optimal solution for three different sample trajectories corresponding to solving the optimization problem with α=1. Although the trajectories have larger deviations from the reference, they do maintain the same geometry as the reference and, despite large deviations, the spacecraft repeatedly approaches the baseline solution, suggesting that a relatively low-cost maneuver can always be implemented to put the spacecraft back on the reference trajectory.

Figure 8A:
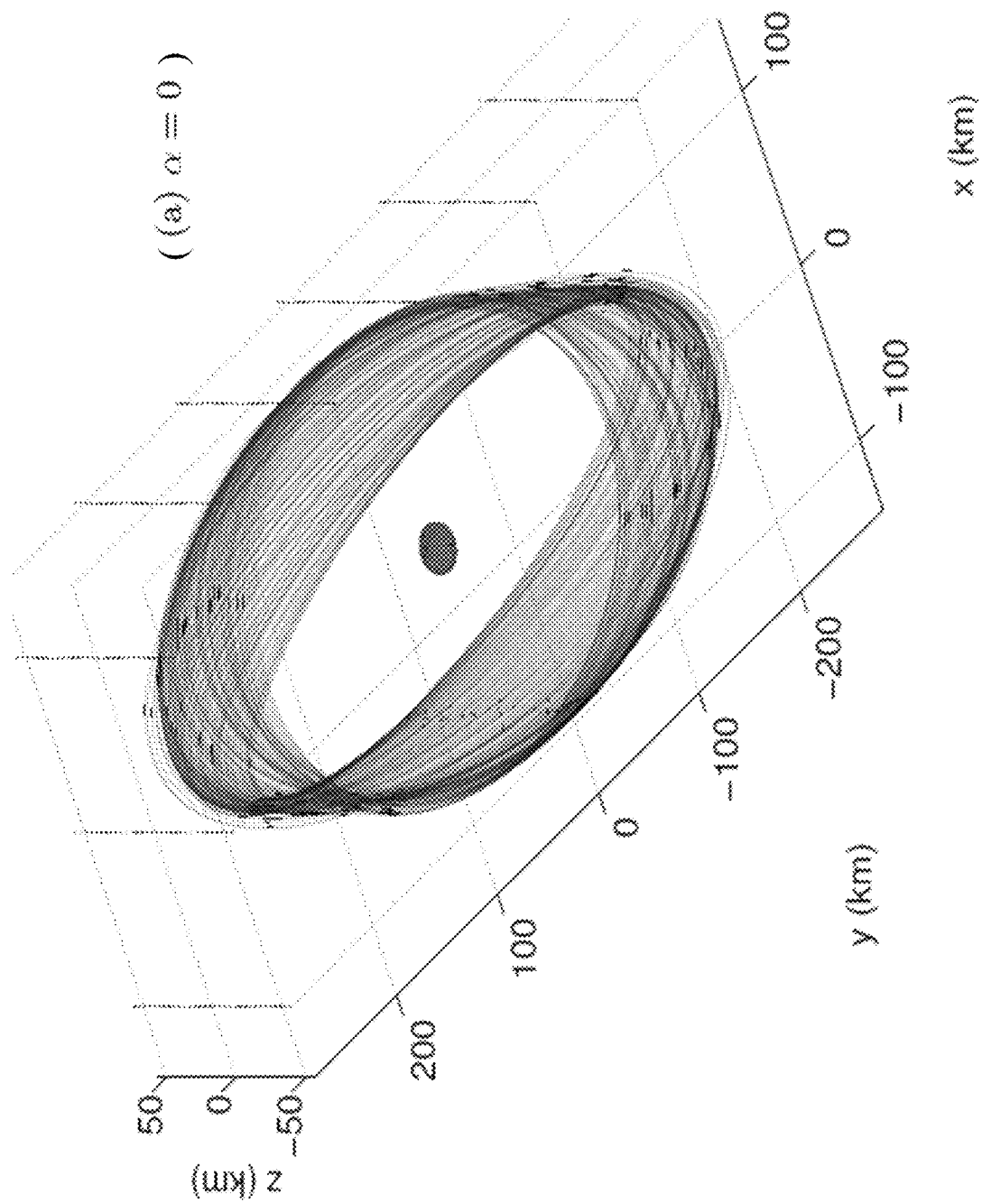
FIG. 8A and FIG. 8B shows a comparison of two trajectories corresponding to $\alpha=0$ (FIG. 8A) and 1 (FIG. 8B), such that the tight station-keeping solution in FIG. 8A is obtained using $\alpha=0$, and is comparable to the station-keeping in FIG. 8B having results achieved by using the trajectory-tracking technique with r set to 10−4, according to some embodiment of the present disclosure.
Figure 8B:
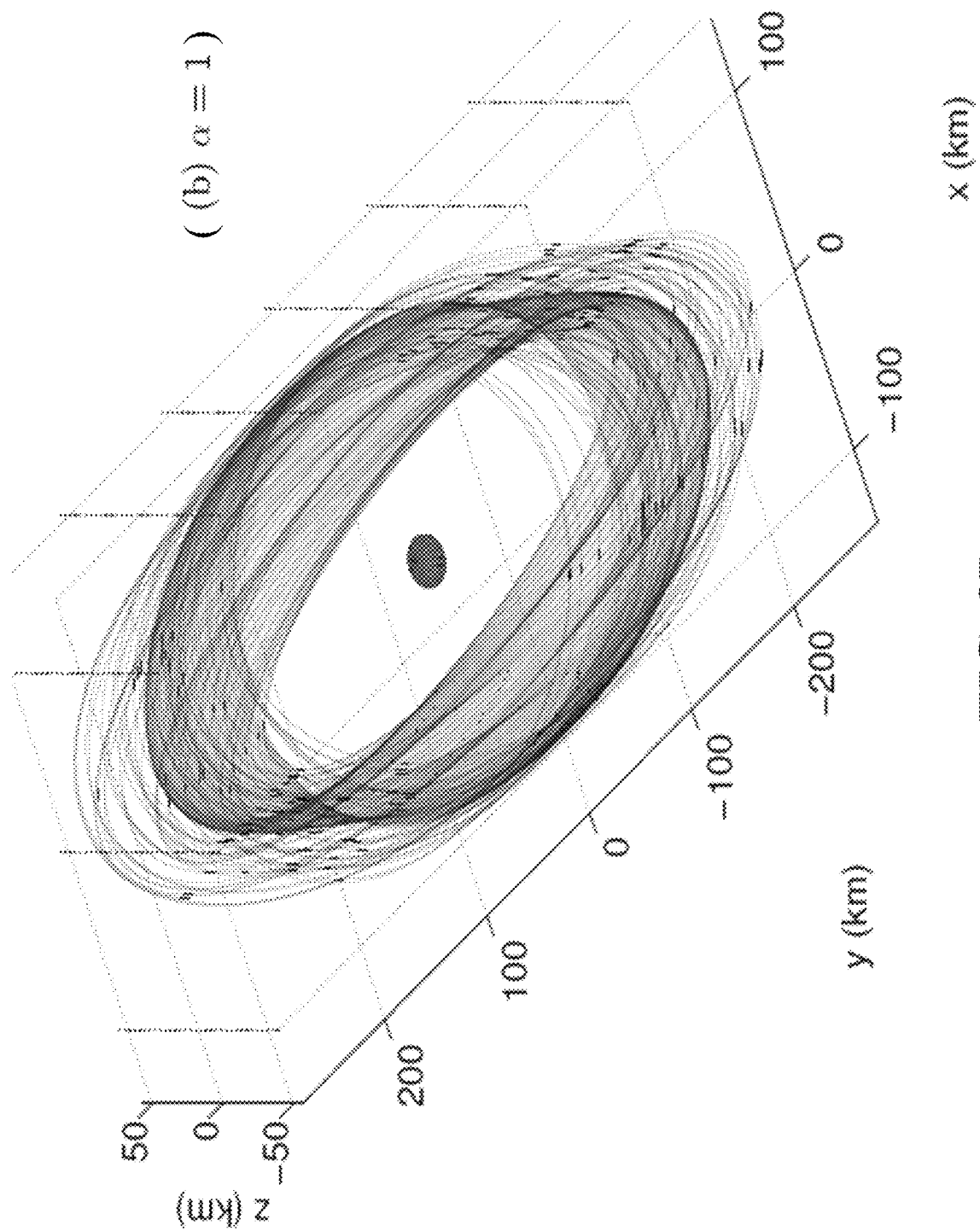

FIG. 8A and FIG. 8B shows a comparison of two trajectories corresponding to α=0 (FIG. 8A) and 1 (FIG. 8B), according to some embodiments of the present disclosure. For example, the tight station-keeping solution in FIG. 8A is obtained using α=0, and the minimum-fuel solution in FIG. 8B is obtained using α=1.

FIG. 9 illustrates Table 2 of 30-day trajectory tracking station-keeping fuel cost for different choices of N, according to some embodiments of the present disclosure. For example, performed are further simulations to refine our choice for the time horizon N. Although a direct comparison cannot be made between these results and the trajectory-tracking scheme, the results, available in Table 2, show a consistent improvement in fuel consumption when using the former. Additionally, to showcase the versatility of this approach, we performed simulations corresponding to α=0.5, and the results are also available in Table 2 (FIG. 9). As expected, an intermediate value of a such as 0.5 results in intermediate station-keeping cost and deviation.

Figure 10:
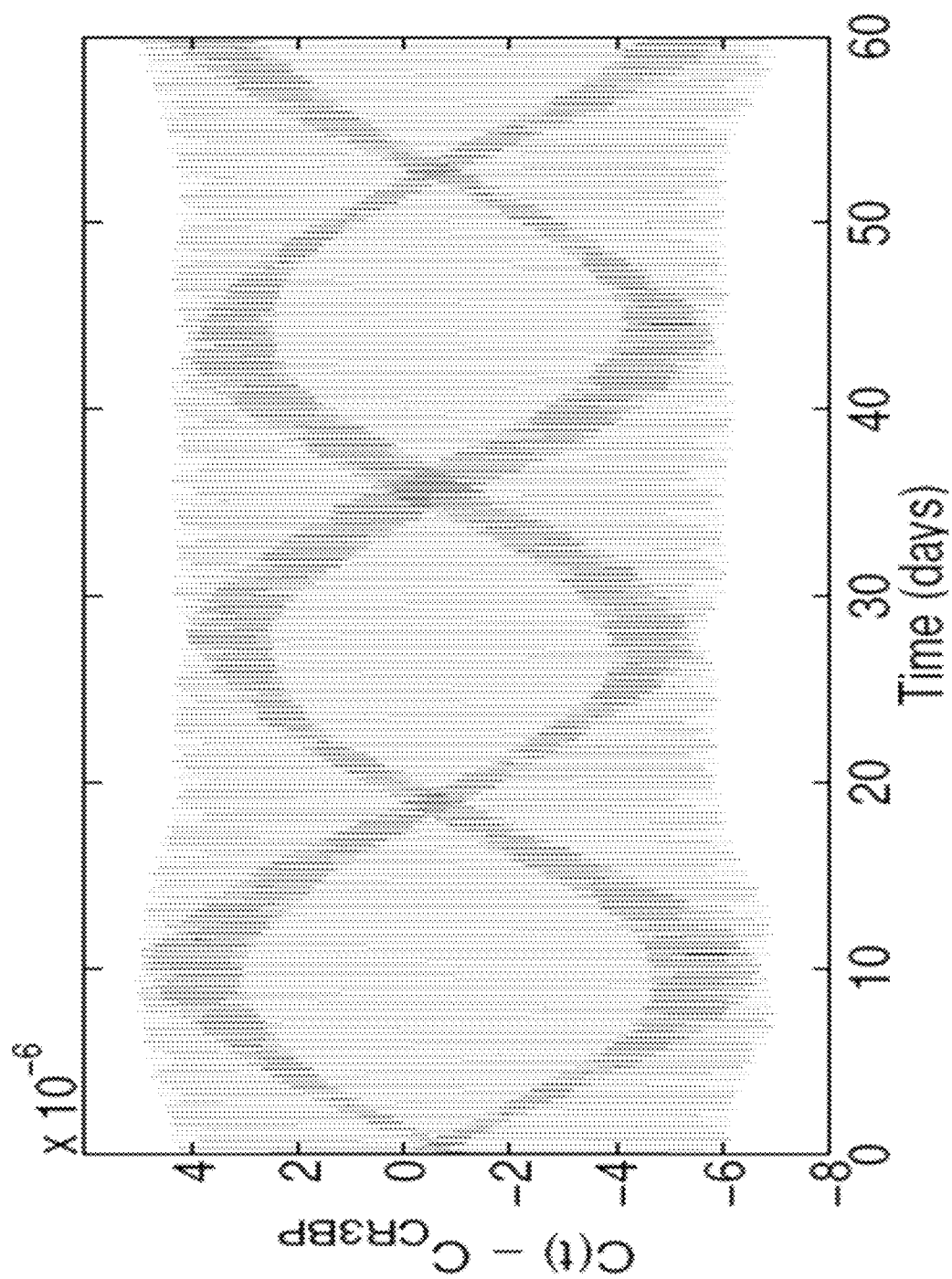
FIG. 10 illustrates a graph of Jacobi value deviation from nominal Jacobi constant in simulation using the ephemeris model), according to some embodiments of the present disclosure.

FIG. 10 illustrates a graph of Jacobi value deviation from nominal Jacobi constant in simulation using the ephemeris model), according to some embodiments of the present disclosure. For example, the Jacobi constant in the ephemeris model in the case of a higher fidelity model, in addition to the position states, velocity states, and time of propagation, the epoch time is also a dependent variable and hence it must also be incorporated into the design vector. The Jacobi constant is not constant in this model but the variable, computed according to (2), remains bounded along the reference trajectory, as shown in FIG. 10. The bounded Jacobi values indicate the bounded nature of the reference trajectory. In contrast to matching the Jacobi constant at the N-th node in the circular restricted model, in the higher fidelity case we instead match the Jacobi constant determined at the end of the horizon, i.e., we modify (9d) to, $$C_{N|k} = C_{ref}(t_{N|k}).$$

where $C_{ref}(t)$ was determined offline and whose deviation from $C_d$ is shown in FIG. 10.

Setting $\alpha=1$ and N=2, using this approach, we obtain a 30-day fuel cost of 0.55 m/s with a set to 1, and 7.33 m/s with a set to 0.

The results clearly show that both approaches can be modified to achieve low fuel consumption or good station keeping. The trajectory-tracking approach achieves acceptable tracking even at low fuel consumption, while neighborhood station-keeping, although staying in the neighborhood, does not exhibit close tracking. For this reason, the former method is recommended for ordinary scientific exploration, but the latter can still be useful in situations where considerations of fuel consumption are paramount, i.e., we need to minimize fuel and hence set $\alpha=1$. Such a situation can arise in emergencies or system failure.

In this work, we explored station-keeping on the QSO around Mars's moon, Phobos. We considered two kinds of station-keeping approaches; one was based on linear dynamics with the goal of close tracking and the other was based on nonlinear dynamics with the goal of stabilizing to the manifold determined by a desired Jacobi constant. The trajectory-tracking method provides better fuel consumption when the tracking is accurate. Because it is free to track trajectories with the same Jacobi constant as the reference trajectory, stabilization to the manifold provides better fuel consumption overall at the expense of close tracking. For this reason, we recommend this technique for orbit maintenance with a strict fuel savings requirement.

Features

An aspect of the present disclosure includes the thruster command module receiving the delta v commands, converting the delta v commands to thruster commands, such that the thruster command module sends the thruster commands to a thruster processor of the at least one thruster, to activate the at least one thruster for trajectory-tracking control of the vehicle, according to the converted delta v commands.

Another aspect includes the free trajectory module uses the feedback gain at each patch point along the free trajectory to obtain a corresponding feedback control law, such that the free trajectory module uses a dominant disturbance source module for determining dominant sources of disturbances above a predetermined threshold, to assist in computing the free trajectory.

Another aspect includes the state penalty function at each patch point of the free trajectory is set to match a state uncertainty function at a previous patch point or a next patch point along the free trajectory, such that the patch points are sequential patch points along the free trajectory.

Another aspect includes the first celestial body is a moon of Mars located within a Mars-Phobos system, and the initial orbit is obtained from the received space data or the historical space date, and the initial orbit is an initial Phobos orbit, and the target orbit is a target Phobos orbit, such that the initial Phobos orbit is similar to the target Phobos orbit, within the Mars-Phobos system. Another aspect includes the target orbit is based on a solution using circular restricted three-body problem.

Another aspect includes the identifying of the target orbit is based on determining a quasi-satellite orbit (QSO) of a size 100 km×200 km×60 km with a trajectory that moves in a clockwise direction when viewed in a x-y plane in relation to Phobos. Based on, generating a family of distant retrograde orbits (DROs) with an approximate dimension of 100 km-by-200 km in a x-y plane in relation to Phobos. Stacking each DRO of the DROs on top of each other sequentially in time, with each revolution of the vehicle around Phobos discretized into 4 patch points. Implementing a multiple-shooting continuation module based on the approach described in relation to FIG. 3 with an additional constraint of a fixed z-coordinate of a first patch point, that results in a continuous, free trajectory, to obtain an initial target orbit. Updating the multiple-shooting continuation module with the initial target orbit. Such that the updated multiple-shooting continuation module includes a higher target z-amplitude than a target z-amplitude from the multiple-shooting continuation module. Iteratively, updating the multiple-shooting continuation module until a z-coordinate of the first patch point is equal to a desired 60 km, then stop the iteration, to obtain the target orbit.

Another aspect includes the dominant disturbance source module determines the dominant sources of disturbances by, measuring a maximum amount of disturbance forces acting on the vehicle during at least revolution around Phobos. Or, by simulating a trajectory of the vehicle subject to baseline dynamics and each disturbance force separately, and comparing a maximum deviation from a nominal Phobos orbit, computed according to the baseline dynamics, for each disturbance. Another aspect includes the optimal control module is an linear quadratic regulator problem.

Another aspect includes the predetermined threshold is below a force caused by unpredictable uncertainties in the system, such that the unpredictable uncertainties in the system are modeled statistically using a statistical model that is a normal distribution.

Another aspect includes the predetermined threshold is obtained from a measurement error in a Deep Space Network and a distance of the vehicle from the Deep Space Network, such that the predetermined threshold is verified using the feedback control law.

Another aspect includes the state penalty function is a quadratic function including state penalty matrices, such that the state penalty matrices are determined by propagating a Riccati difference equation backwards in time. The state uncertainty function is derived from the quadratic function. Wherein the state uncertainty function includes state uncertainty matrices. Wherein the state uncertainty matrices are determined by propagating closed-loop system dynamics, forwards in time, to obtain the state uncertainty matrices, and then repeating the process iteratively, until a convergence threshold. Wherein the convergence threshold corresponds to a change in the feedback law of less than 0.01%.

Another aspect includes the feedback gain module determines the feedback gain by setting the state penalty matrices to the state uncertainty matrices and propagating a Riccati difference equation backwards in time.

Definitions

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

FIG. 11A, FIG. 11B, FIG. 11C, FIG. 11D and FIG. 11E are schematic diagrams illustrating of some conventional parameters to better understand aspects used for implementing some aspects of the methods and systems, according to some embodiments of the present disclosure.

Figures 11A, 11B:
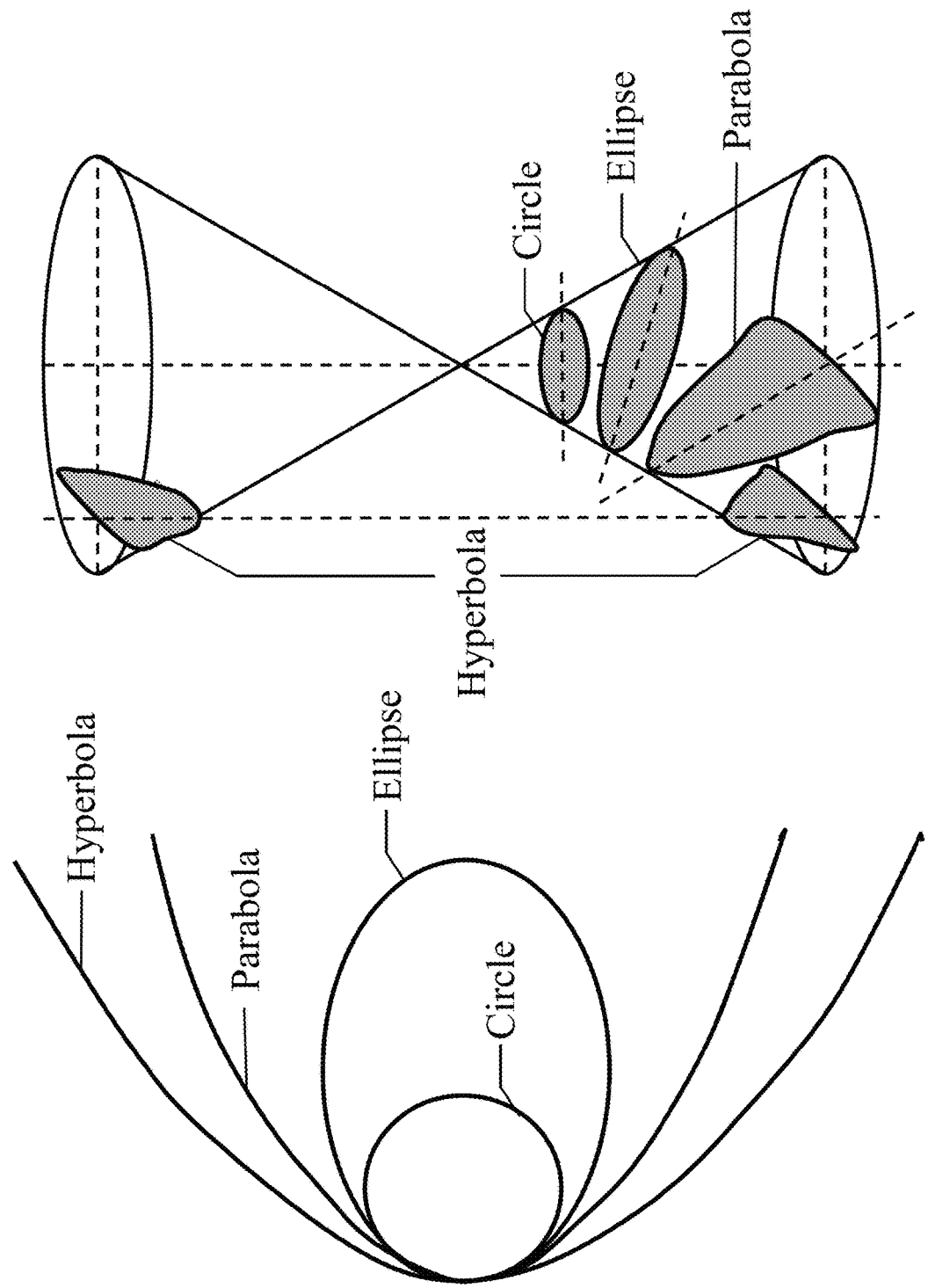
FIG. 11A, FIG. 11B, FIG. 11C, FIG. 11D and FIG. 11E are schematic diagrams of some conventional parameters to better understand aspects used for implementing some aspects of the methods and systems, according to some embodiments of the present disclosure.

Conic Sections: Referring to the FIG. 11A and FIG. 11B, a conic section, or just conic, is a curve formed by passing a plane through a right circular cone. FIG. 11A and FIG. 11B show an angular orientation of a plane relative to the cone that determines whether the conic section is a circle, ellipse, parabola, or hyperbola. The circle and the ellipse arise when the intersection of cone and plane is a bounded curve. The circle is a special case of the ellipse in which the plane is perpendicular to the axis of the cone. If the plane is parallel to a generator line of the cone, the conic is called a parabola. Finally, if the intersection is an unbounded curve and the plane is not parallel to a generator line of the cone, the figure is a hyperbola. In the latter case, the plane will intersect both halves of the cone, producing two separate curves. All conic sections can be defined in terms of the eccentricity. The type of conic section is also related to the semi-major axis and the energy. The table below shows the relationships between eccentricity, semi-major axis, and energy and the type of conic section.

| Conic Section | Eccentricity, e | Semi-major axis | Energy |
| --- | --- | --- | --- |
| Circle | 0 | =radius | <0 |
| Ellipse | 0 < e < 1 | >0 | <0 |
| Parabola | 1 | infinity | 0 |
| Hyperbola | >1 | <0 | >0 |

Satellite orbits can be any of the four conic sections. This page deals mostly with elliptical orbits, though we conclude with an examination of the hyperbolic orbit.

Figure 11D:
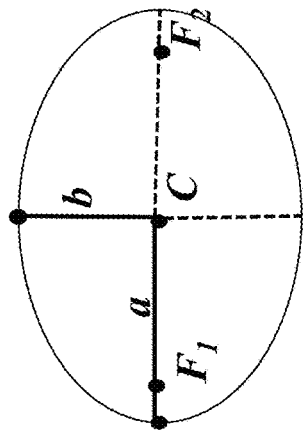
Figure 11C:
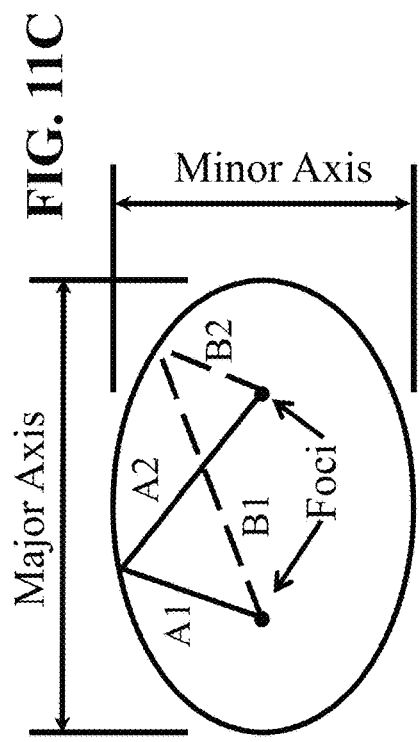
Figure 11E:
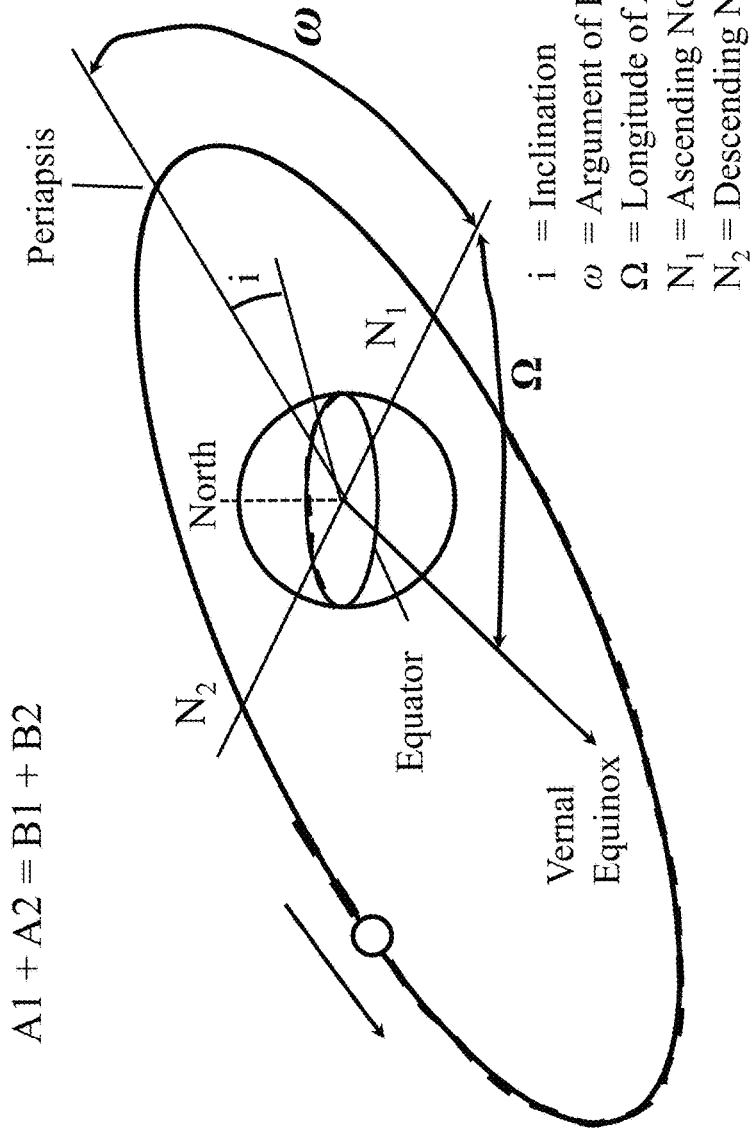

Referring to the FIG. 11C, FIG. 11D and FIG. 11E, to mathematically describe a conventional orbit one must define six quantities, called orbital elements. They are
Semi-Major Axis, a
Eccentricity, e
Inclination, i
Argument of Periapsis, ω
Time of Periapsis Passage, T
Longitude of Ascending Node, Ω

FIG. 11C to FIG. 11E show an conventional orbiting satellite that follows an oval shaped path known as an ellipse with the body being orbited, called the primary, located at one of two points called foci. FIG. 11 C shows an ellipse defined to be a curve with the following property: for each point on an ellipse, the sum of its distances from two fixed points, called foci, is constant. The longest and shortest lines that can be drawn through the center of an ellipse are called the major axis and minor axis, respectively. The semi-major axis is one-half of the major axis and represents a satellite's mean distance from its primary. Eccentricity is the distance between the foci divided by the length of the major axis and is a number between zero and one. An eccentricity of zero indicates a circle.

FIG. 11E shows inclination i that is the angular distance between a satellite's orbital plane and the equator of its primary (or the ecliptic plane in the case of heliocentric, or sun centered, orbits). An inclination i of zero degrees indicates an orbit about the primary's equator in the same direction as the primary's rotation, a direction called prograde (or direct). An inclination i of 90 degrees indicates a polar orbit. An inclination i of 180 degrees indicates a retrograde equatorial orbit. A retrograde orbit is one in which a satellite moves in a direction opposite to the rotation of its primary.

Still referring to FIG. 11E, periapsis co is the point in an orbit closest to the primary (i.e. for an object moving in an elliptical orbit about another celestial body, the point of closest approach is the periapsis, and at this point in the orbit, the object is travelling at its greatest speed via Kepler's Second Law). The opposite of periapsis co, the farthest point in an orbit, is called apoapsis (i.e. an object moving in an elliptical orbit about another celestial body, the point of greatest separation is the apoapsis, at this point in the orbit, the object is travelling at its slowest speed via Kepler's Second Law). A perihelion is a position of closest approach, i.e. the shortest distance between the Sun and the planet, at this point in the orbit, the planet is moving at its maximum speed via Kepler's Second Law. An aphelion is a greatest distance between the Sun and the planet, at this point in the orbit, the planet is moving at its slowest speed via Kepler's Second Law, such that the aphelion refers specifically to orbits around the Sun, and is equivalent to the apoapsis of a general orbit. Wherein, the periapsis co and apoapsis are usually modified to apply to the body being orbited, such as perihelion and aphelion for the Sun, perigee and apogee for Earth, perijove and apojove for Jupiter, perilune and apolune for the Moon, etc. The argument of periapsis co is the angular distance between the ascending node $N_1$ and the point of periapsis (see FIG. 11E). The time of periapsis passage T is the time in which a satellite moves through its point of periapsis.

Periapsis: The point of a body's elliptical orbit about the system's center of mass where the distance between the body and the center of mass is at its minimum. Wherein, the argument of periapsis (also called argument of perifocus or argument of pericenter), symbolized as ω, is one of the orbital elements of an orbiting body. Parametrically, ω is the angle from the body's ascending node to its periapsis, measured in the direction of motion. For specific types of orbits, words including perihelion (for heliocentric orbits), perigee (for geocentric orbits), Periastron (for orbits around stars), and so on may replace the word periapsis. An argument of periapsis of 0° means that the orbiting body will be at its closest approach to the central body at the same moment that it crosses the plane of reference from South to North. An argument of periapsis of 90° means that the orbiting body will reach periapsis at its north most distance from the plane of reference. Adding the argument of periapsis to the longitude of the ascending node gives the longitude of the periapsis. However, especially in discussions of binary stars and exoplanets, the terms "longitude of periapsis" or "longitude of periastron" are often used synonymously with "argument of periapsis".

Apoapsis: The point of a body's elliptical orbit about the system's centre of mass where the distance between the body and the centre of mass is at its maximum.

Nodes: are the points where an orbit crosses a plane, such as a satellite crossing the Earth's equatorial plane. If the satellite crosses the plane going from south to north, the node is the ascending node $N_1$; if moving from north to south, it is the descending node $N_2$. The longitude of the ascending node $N_1$ is the node's celestial longitude. Celestial longitude is analogous to longitude on Earth and is measured in degrees counter-clockwise from zero with zero longitude being in the direction of the vernal equinox Q.

Achieving Conventional Orbit Example: For a spacecraft to achieve Earth orbit, it must be launched to an elevation above the Earth's atmosphere and accelerated to orbital velocity. A most energy efficient orbit, can be one that requires the least amount of propellant, and is a direct low inclination orbit. To achieve such an conventional orbit, a spacecraft is launched in an eastward direction from a site near the Earth's equator. The advantage being that the rotational speed of the Earth contributes to the spacecraft's final orbital speed. At the United States' launch site in Cape Canaveral (28.5 degrees north latitude), a due east launch results in a "free ride" of 1,471 km/h (914 mph). Launching a spacecraft in a direction other than east, or from a site far from the equator, results in an orbit of higher inclination. High inclination orbits are less able to take advantage of the initial speed provided by the Earth's rotation, thus the launch vehicle must provide a greater part, or all, of the energy required to attain orbital velocity. Although high inclination orbits are less energy efficient, they do have advantages over equatorial orbits for certain applications. Below are several and some advantages of each:

Types of orbits: Geosynchronous orbits (GEO): are circular orbits around the Earth having a period of 24 hours. A geosynchronous orbit with an inclination of zero degrees is called a geostationary orbit. A spacecraft in a geostationary orbit appears to hang motionless above one position on the Earth's equator. For this reason, they are ideal for some types of communication and meteorological satellites. A spacecraft in an inclined geosynchronous orbit will appear to follow a regular figure-8 pattern in the sky once every orbit. To attain geosynchronous orbit, a spacecraft is first launched into an elliptical orbit with an apogee of 35,786 km (22,236 miles) called a geosynchronous transfer orbit (GTO). The orbit is then circularized by firing the spacecraft's engine at apogee. Polar orbits (PO): are orbits with an inclination of 90 degrees. Polar orbits are useful for satellites that carry out mapping and/or surveillance operations because as the planet rotates the spacecraft has access to virtually every point on the planet's surface. Walking orbits: An orbiting satellite is subjected to a great many gravitational influences. First, planets are not perfectly spherical and they have slightly uneven mass distribution. These fluctuations have an effect on a spacecraft's trajectory. In addition, the sun, moon, and planets contribute a gravitational influence on an orbiting satellite. With proper planning, it is possible to design an orbit, which takes advantage of these influences to induce a precession in the satellite's orbital plane. The resulting orbit is called a walking orbit. Sun synchronous orbits (SSO): are walking orbits whose orbital plane precesses with the same period as the planet's solar orbit period. In such an orbit, a satellite crosses periapsis at about the same local time every orbit. This is useful if a satellite is carrying instruments, which depend on a certain angle of solar illumination on the planet's surface. In order to maintain an exact synchronous timing, it may be necessary to conduct occasional propulsive maneuvers to adjust the orbit. Molniya orbits: are highly eccentric Earth orbits with periods of approximately 12 hours (2 revolutions per day). The orbital inclination is chosen so the rate of change of perigee is zero, thus both apogee and perigee can be maintained over fixed latitudes. This condition occurs at inclinations of 63.4 degrees and 116.6 degrees. For these orbits, the argument of perigee is typically placed in the southern hemisphere, so the satellite remains above the northern hemisphere near apogee for approximately 11 hours per orbit. This orientation can provide good ground coverage at high northern latitudes. Hohmann transfer orbits: are interplanetary trajectories whose advantage is that they consume the least possible amount of propellant. A Hohmann transfer orbit to an outer planet, such as Mars, is achieved by launching a spacecraft and accelerating it in the direction of Earth's revolution around the sun until it breaks free of the Earth's gravity and reaches a velocity, which places it in a sun orbit with an aphelion equal to the orbit of the outer planet. Upon reaching its destination, the spacecraft must decelerate so that the planet's gravity can capture it into a planetary orbit. For example, to send a spacecraft to an inner planet, such as Venus, the spacecraft is launched and accelerated in the direction opposite of Earth's revolution around the sun (i.e. decelerated) until it achieves a sun orbit with a perihelion equal to the orbit of the inner planet. It should be noted that the spacecraft continues to move in the same direction as Earth, only more slowly. To reach a planet requires that the spacecraft be inserted into an interplanetary trajectory at the correct time so that the spacecraft arrives at the planet's orbit when the planet will be at the point where the spacecraft will intercept it. This task is comparable to a quarterback "leading" his receiver so that the football and receiver arrive at the same point at the same time. The interval of time in which a spacecraft must be launched in order to complete its mission is called a launch window. Near-rectilinear halo orbits (NRHOs): can be defined as "almost stable" orbits where stability is measured using stability indexes ν.

CR3BP model: Near rectilinear halo orbits are members of the broader set of L1 and L2 families of halo orbits, that is, foundational structures that exist in the dynamical environment modeled in terms of multiple gravitational bodies. L1 is a point $\frac{1}{100}$ of the way from Earth to the sun, or the first Lagrangian point, where centripetal force and the gravitational pulls of Earth and sun all cancel out. It is one of five such points in the Earth-sun system where a space probe could in principle sit forever as though balanced on the gravitational version of the head of a pin. Another one, L2, is on the far side of Earth from the sun, 1.6 million kilometers out. Both L1 and L2 are ideal venues from which to look out toward the universe, and L1 is a good vantage on Earth and the sun, as well. However, they have drawbacks: At L1, a spacecraft's signal would be overwhelmed by the radiation from the sun behind it. At L2, Earth's shadow blocks the solar radiation a probe needs to power its instruments. The solution is to put spacecraft into "halo orbits" around the Lagrangian points. A spacecraft in a halo orbit around L1 describes huge, lazy loops perpendicular to the Earth-sun axis, endlessly falling toward the balance point. The fundamental behavior also persists in a higher-fidelity model and, thus, supports potential long-term mission scenarios for spacecraft, possibly crewed, in orbits near the Moon. This type of trajectory is first identified in a simplified representation of the gravitational effects in the Earth-Moon system, i.e., the Circular Restricted Three Body Problem (CR3BP). In the CR3BP model, Near-rectilinear halo orbits (NRHOs), i.e. can be defined as "almost stable" orbits where stability is measured using stability indexes ν, are characterized by favorable stability properties that suggest the potential to maintain NRHO-like motion over a long duration while consuming few propellant resources. Some NRHOs also possess favorable resonance properties that can be exploited for mission design and are particularly useful to avoid eclipses. For actual mission implementations, however, transfers into such orbits, as well as station keeping strategies, must be demonstrated in a higher-fidelity ephemeris model. Station keeping algorithms for libration point orbits have previously been explored within this dynamical regime in the context of both planar Lyapunov and classical three-dimensional halo orbits. However, NRHOs as constructed in the ephemeris regime.

Station Keeping: In astrodynamics, the orbital maneuvers made by thruster burns that are needed to keep a spacecraft in a particular assigned orbit are called orbital stationkeeping. For many Earth satellites the effects of the non-Keplerian forces, i.e. the deviations of the gravitational force of the Earth from that of a homogeneous sphere, gravitational forces from Sun/Moon, solar radiation pressure and air drag, must be counteracted. The deviation of Earth's gravity field from that of a homogeneous sphere and gravitational forces from Sun/Moon will in general perturb the orbital plane. For a sun-synchronous orbit the precession of the orbital plane caused by the oblateness of the Earth is a desirable feature that is part of the mission design but the inclination change caused by the gravitational forces of Sun/Moon is undesirable. For geostationary spacecraft the inclination change caused by the gravitational forces of the Sun & Moon must be counteracted by a rather large expense of fuel, as the inclination should be kept sufficiently small for the spacecraft to be tracked by a non-steerable antenna. For spacecraft in low orbits the effects of atmospheric drag must often be compensated for. For some missions this is needed simply to avoid re-entry; for other missions, typically missions for which the orbit should be accurately synchronized with Earth rotation, this is necessary to avoid the orbital period shortening. Solar radiation pressure will in general perturb the eccentricity (i.e. the eccentricity vector), see Orbital perturbation analysis (spacecraft). For some missions this must be actively counter-acted with maneuvers. For geostationary spacecraft the eccentricity must be kept sufficiently small for a spacecraft to be tracked with a non-steerable antenna. Also for Earth observation spacecraft for which a very repetitive orbit with a fixed ground track is desirable, the eccentricity vector should be kept as fixed as possible. A large part of this compensation can be done by using a frozen orbit design, but for the fine control maneuvers with thrusters are needed. For spacecraft in a halo orbit around a Lagrangian point station-keeping is even more fundamental, as such an orbit is unstable; without an active control with thruster burns the smallest deviation in position/velocity would result in the spacecraft leaving the orbit completely.

Dominant Disturbance Forces: Dominant disturbance is one which causes deviation larger than the navigation error of the deep space network (DSN) positioning system. Also, a dominant force can be defined as a force whose effect is larger than the largest unpredictable force. Also, a largest Unpredictable Force can be due to position and velocity measurement error.

Perturbation: can be a complex motion of a massive body subject to forces other than the gravitational attraction of a single other massive body. The other forces can include a third (fourth, fifth, etc.) body, resistance, as from an atmosphere, and the off-center attraction of an oblate or otherwise misshapen body. The perturbing forces of the Sun on the Moon at two places in its orbit. The dark dotted arrows represent the direction and magnitude of the gravitational force on the Earth. Applying this to both the Earth's and the Moon's position does not disturb the positions relative to each other. When it is subtracted from the force on the Moon (dark solid arrow), what is left is the perturbing force (dark double arrows) on the Moon relative to the Earth. Because the perturbing force is different in direction and magnitude on opposite sides of the orbit, it produces a change in the shape of the orbit.

Phobos is the innermost and larger of the two natural satellites of Mars, the other being Deimos. Phobos is a small, irregularly shaped object with a mean radius of 11 km (7 mi) and is seven times as massive as the outer moon, Deimos. Phobos orbits 6,000 km (3,700 mi) from the Martian surface, closer to its primary body than any other known planetary moon. It is so close that it orbits Mars much faster than Mars rotates, and completes an orbit in just 7 hours and 39 minutes. As a result, from the surface of Mars it appears to rise in the west, move across the sky in 4 hours and 15 minutes or less, and set in the east, twice each Martian day. Phobos is one of the least reflective bodies in the Solar System, with an albedo of just 0.071. Surface temperatures range from about −4° C. (25° F.) on the sunlit side to −112° C. (−170° F.) on the shadowed side.

FIG. 12A is a block diagram illustrating some system and method steps for implementing some orbital designs, according to an embodiment of the present disclosure. A thruster controller module 1210 can include a processor 1220 that can convert 1224 the received delta commands 1201 to thruster commands 1226 that can be sent via bus 1228 to the thrusters 1243 of the sub-control thruster 1240, that can be connected to sensors 1248.

Figure 12B:
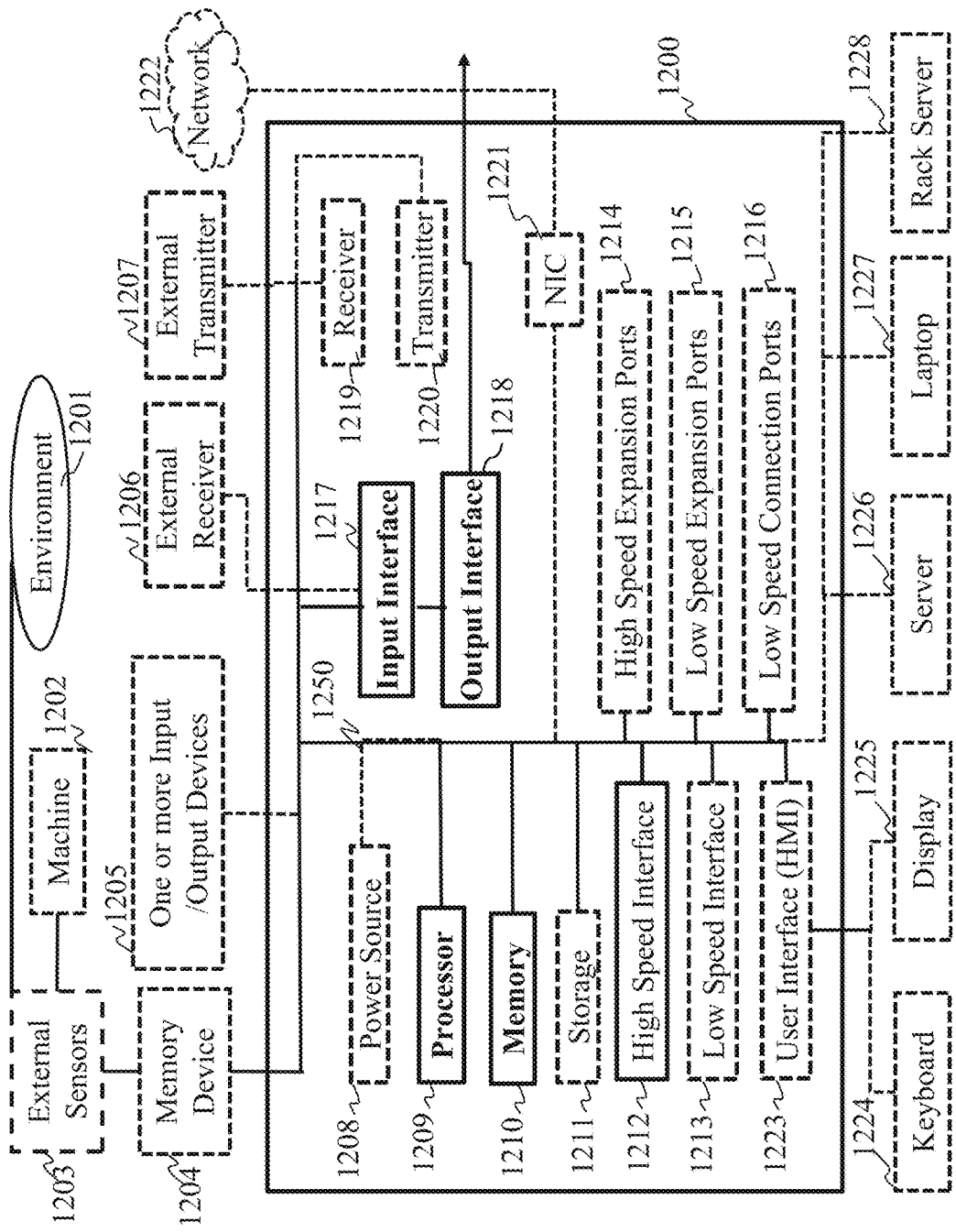
FIG. 12B is a block diagram illustrating some system and method steps for orbital design, according to an embodiment of the present disclosure.

FIG. 12B is a schematic illustrating by non-limiting example a computing apparatus 1200 that can be used to implement some techniques of the methods and systems, according to embodiments of the present disclosure. The computing apparatus or device 1200 represents various forms of digital computers, such as laptops, desktops, workstations, personal digital assistants, servers, blade servers, mainframes, and other appropriate computers.

The computing device 1200 can include a power source 1208, a processor 1209, a memory 1210, a storage device 1211, all connected to a bus 1250. Further, a high-speed interface 1212, a low-speed interface 1213, high-speed expansion ports 1214 and low speed connection ports 1216, can be connected to the bus 1250. In addition, one or more low-speed expansion ports 1215 may be in connection with the bus 1250. Contemplated are various component configurations that may be mounted on a common motherboard depending upon the specific application. Further still, an input interface 1217 can be connected via bus 1250 to an external receiver 1206 and an output interface 1218. A receiver 1219 can be connected to an external transmitter 1207 and a transmitter 1220 via the bus 1250. Also connected to the bus 1250 can be an external memory 1204, external sensors 1203, machine(s) 1202 and an environment 1201. Further, one or more external input/output devices 1205 can be connected to the bus 1250. A network interface controller (NIC) 1221 can be adapted to connect through the bus 1250 to a network 1222, wherein data or other data, among other things, can be rendered on a third party display device, third party imaging device, and/or third party printing device outside of the computer device 1200.

Contemplated is that the memory 1210 can store instructions that are executable by the computer device 1200, historical data, and any data that can be utilized by the methods and systems of the present disclosure. The memory 1210 can include random access memory (RAM), read only memory (ROM), flash memory, or any other suitable memory systems. The memory 1210 can be a volatile memory unit or units, and/or a non-volatile memory unit or units. The memory 1210 may also be another form of computer-readable medium, such as a magnetic or optical disk.

Still referring to FIG. 12B, a storage device 1211 can be adapted to store supplementary data and/or software modules used by the computer device 1200. For example, the storage device 1211 can store historical data and other related data as mentioned above regarding the present disclosure. Additionally, or alternatively, the storage device 1211 can store historical data similar to data as mentioned above regarding the present disclosure. The storage device 1211 can include a hard drive, an optical drive, a thumbdrive, an array of drives, or any combinations thereof. Further, the storage device 1211 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1209), perform one or more methods, such as those described above.

The system can be linked through the bus 1250 optionally to a display interface or user Interface (HMI) 1223 adapted to connect the system to a display device 1225 and keyboard 1224, wherein the display device 1225 can include a computer monitor, camera, television, projector, or mobile device, among others.

Still referring to FIG. 12B, the computer device 1200 can include a user input interface 1217 adapted to a printer interface (not shown) can also be connected through bus 1250 and adapted to connect to a printing device (not shown), wherein the printing device can include a liquid inkjet printer, solid ink printer, large-scale commercial printer, thermal printer, UV printer, or dye-sublimation printer, among others.

The high-speed interface 1212 manages bandwidth-intensive operations for the computing device 1200, while the low-speed interface 1213 manages lower bandwidth-intensive operations. Such allocation of functions is an example only. In some implementations, the high-speed interface 1212 can be coupled to the memory 1210, a user interface (HMI) 1223, and to a keyboard 1224 and display 1225 (e.g., through a graphics processor or accelerator), and to the high-speed expansion ports 1214, which may accept various expansion cards (not shown) via bus 1250. In the implementation, the low-speed interface 1213 is coupled to the storage device 1211 and the low-speed expansion port 1215, via bus 1250. The low-speed expansion port 1215, which may include various communication ports (e.g., USB, Bluetooth, Ethernet, wireless Ethernet) may be coupled to one or more input/output devices 1205, and other devices a keyboard 1224, a pointing device (not shown), a scanner (not shown), or a networking device such as a switch or router, e.g., through a network adapter.

Still referring to FIG. 12B, the computing device 1200 may be implemented in a number of different forms, as shown in the figure. For example, it may be implemented as a standard server 1226, or multiple times in a group of such servers. In addition, it may be implemented in a personal computer such as a laptop computer 1227. It may also be implemented as part of a rack server system 1228. Alternatively, components from the computing device 1200 may be combined with other components in a mobile device (not shown). Each of such devices may contain one or more of the computing device and the mobile computing device, and an entire system may be made up of multiple computing devices communicating with each other.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further, some embodiments of the present disclosure can be implemented as one or more computer programs, i.e., one or more modules of computer program instructions encoded on a tangible non-transitory program carrier for execution by, or to control the operation of, data processing apparatus. Further still, program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure, the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What we claim is:

1. A system for activating at least one thruster of a propulsion system of a vehicle for trajectory-tracking control of the vehicle, comprising:
   a memory having stored data, the data includes executable instructions, vehicle data and historical space data;
   an input interface configured to receive space data;
   a processor configured to execute the executable instructions to generate a transfer orbit for the vehicle from an initial orbit to a target orbit, wherein to generate the transfer orbit, the processor is configured to:
      compute the target orbit for the vehicle about Phobos by determining a quasi-satellite orbit (QSO) with a trajectory that moves in a clockwise direction when viewed in a x-y plane in relation to Phobos, wherein to determine the QSO the processor is further configured to:
         generate a family of distant retrograde orbits (DROs) in a x-y plane in relation to Phobos;
         stack each DRO of the DROs on top of each other sequentially in time, with each revolution of the vehicle around Phobos discretized into a plurality of patch points;
         implement a multiple-shooting continuation module with an additional constraint of a fixed z-coordinate of a first patch point of the plurality of patch points, that results in a continuous, free trajectory, to obtain an initial target orbit;
         update the multiple-shooting continuation module with the initial target orbit, such that the updated multiple-shooting continuation module includes a first target z-amplitude higher than a second target z-amplitude from the multiple-shooting continuation module; and
         iteratively, update the multiple-shooting continuation module until a z-coordinate of the first patch point is equal to a desired threshold, then stop the iteration, to obtain the target orbit;
      compute a free trajectory with patch points along the free trajectory, such that each patch point along the free trajectory includes a position and a velocity;

determine a feedback gain at each patch point of the patch points along the free trajectory, such that a state penalty function at each patch point of the free trajectory is set to match a state uncertainty function at a respective patch point of the free trajectory;

apply the feedback gain at each patch point to map the position and the velocity at each patch point to delta v commands, in order to maintain the target orbit;

output the delta v commands, to activate the at least one thruster for the trajectory-tracking control of the vehicle.

2. The system of claim 1, wherein the processor is further configured to:
receive the delta v commands;
convert the delta v commands to thruster commands; and
control transmission of the thruster commands to a thruster processor of the at least one thruster, to activate the at least one thruster for trajectory-tracking control of the vehicle, according to the converted delta v commands.

3. The system of claim 1, wherein the processor is further configured to use the feedback gain at each patch point along the free trajectory to obtain a corresponding feedback control law, and wherein the processor determines dominant sources of disturbances above a predetermined threshold for computing the free trajectory.

4. The system of claim 1, wherein the state penalty function at each patch point of the free trajectory is set to match a state uncertainty function at a previous patch point or a next patch point along the free trajectory, wherein the patch points along the free trajectory are sequential.

5. The system of claim 1, wherein the initial orbit is obtained from the received space data or the historical space date, and wherein the initial orbit is an initial Phobos orbit and the target orbit is a target Phobos orbit, such that the initial Phobos orbit is similar to the target Phobos orbit, within Mars-Phobos system.

6. The system of claim 1, wherein the target orbit is based on a solution using circular restricted three-body problem.

7. The system of claim 1, wherein
the QSO is of a size 100 km×200 km×60 km,
each DRO of the family of DROs has an approximate dimension of 100 km-by-200 km in the x-y plane in relation to Phobos, and
the desired threshold is 60 km.

8. The system of claim 3, wherein the processor determines the dominant sources of disturbances by,
measuring a maximum amount of disturbance forces acting on the vehicle during at least revolution around Phobos, or by
simulating a trajectory of the vehicle subject to baseline dynamics and each disturbance force separately, and
comparing a maximum deviation from a nominal Phobos orbit, computed according to the baseline dynamics, for each disturbance.

9. The system of claim 1, wherein the processor is further configured to track the QSO based on a linear quadratic regulator problem.

10. The system of claim 3, wherein the predetermined threshold is below a force caused by unpredictable uncertainties in the system, such that the unpredictable uncertainties in the system are modeled statistically using a statistical model that is a normal distribution.

11. The system of claim 3, wherein the predetermined threshold is obtained from a measurement error in a Deep Space Network and a distance of the vehicle from the Deep Space Network.

12. The system of claim 1, wherein the state penalty function is a quadratic function including state penalty matrices, such that the state penalty matrices are determined by propagating a Riccati difference equation backwards in time, and the state uncertainty function is derived from the quadratic function, such that the state uncertainty function includes state uncertainty matrices, wherein the state uncertainty matrices are determined by a process comprising propagating closed-loop system dynamics, forwards in time, to obtain the state uncertainty matrices, and then repeating the process iteratively, until a convergence threshold.

13. The system of claim 12, wherein the convergence threshold corresponds to a change in a feedback control law of less than 0.01%, wherein the feedback control law is obtained using the feedback gain at each patch point along the free trajectory.

14. The system of claim 1, wherein the state penalty function is a quadratic function including state penalty matrices, and wherein the processor determines the feedback gain by setting the state penalty matrices to the state uncertainty matrices and propagating a Riccati difference equation backwards in time.

15. A method for activating at least one thruster of a propulsion system of a vehicle for trajectory-tracking control of the vehicle, the method uses a processor coupled to a memory storing executable instructions, vehicle data and historical space data, wherein the processor generates a transfer orbit for the vehicle from an initial orbit to a target orbit, the method comprising:
computing a target orbit for the vehicle about Phobos using space data received via an input interface, based on determining a quasi-satellite orbit (QSO) with a trajectory that moves in a clockwise direction when viewed in a x-y plane in relation to Phobos, wherein determining the QSO comprises:
generating a family of distant retrograde orbits (DROs) in a x-y plane in relation to Phobos;
stacking each DRO of the DROs on top of each other sequentially in time, with each revolution of the vehicle around Phobos discretized into a plurality of patch points;
implementing a multiple-shooting continuation module with an additional constraint of a fixed z-coordinate of a first patch point of the plurality of patch points, that results in a continuous, free trajectory, to obtain an initial target orbit;
updating the multiple-shooting continuation module with the initial target orbit, such that the updated multiple-shooting continuation module includes a first target z-amplitude higher than a second target z-amplitude from the multiple-shooting continuation module; and
iteratively, updating the multiple-shooting continuation module until a z-coordinate of the first patch point is equal to a desired threshold, then stop the iteration, to obtain the target orbit;
computing a free trajectory with patch points along the free trajectory, such that each patch point along the free trajectory includes a position and a velocity;
determining a feedback gain at each patch point of the patch points along the free trajectory, such that a state penalty function at each patch point of the free trajectory is set to match a state uncertainty function at a respective patch point of the free trajectory;
applying the feedback gain at each patch point to map the position and the velocity at each patch point to delta v commands, in order to maintain the target orbit; and outputting the delta v commands via an output interface to activate the at least one thruster for the trajectory-tracking control of the vehicle.

16. The method of claim 15, wherein the state penalty function at each patch point of the free trajectory is set to match a state uncertainty function at a previous patch point or a next patch point along the free trajectory, wherein the patch points along the free trajectory are sequential.

17. The method of claim 15, wherein the state penalty function is a quadratic function including state penalty matrices, such that the state penalty matrices are determined by propagating a Riccati difference equation backwards in time, and the state uncertainty function is derived from the quadratic function, such that the state uncertainty function includes state uncertainty matrices, wherein the state uncertainty matrices are determined by a process comprising propagating closed-loop system dynamics, forwards in time, to obtain the state uncertainty matrices, and then repeating the process iteratively, until a convergence threshold.

18. A non-transitory machine-readable medium including instructions stored thereon which, when executed by processing circuitry, configure the processing circuitry to perform a method to activate at least one thruster of a propulsion system of a vehicle for trajectory-tracking control of the vehicle, the method uses a processor connected to a memory storing executable instructions, vehicle data and historical space data, wherein the processor generates a transfer orbit for the vehicle from an initial orbit to a target orbit, the method comprising:
  computing a target orbit for the vehicle about Phobos using space data received via an input interface, based on determining a quasi-satellite orbit (QSO) with a trajectory that moves in a clockwise direction when viewed in a x-y plane in relation to Phobos, wherein determining the QSO comprises:
    generating a family of distant retrograde orbits (DROs) in a x-y plane in relation to Phobos;
    stacking each DRO of the DROs on top of each other sequentially in time, with each revolution of the vehicle around Phobos discretized into a plurality of patch points;
    implementing a multiple-shooting continuation module with an additional constraint of a fixed z-coordinate of a first patch point of the plurality of patch points, that results in a continuous, free trajectory, to obtain an initial target orbit;
    updating the multiple-shooting continuation module with the initial target orbit, such that the updated multiple-shooting continuation module includes a first target z-amplitude higher than a second target z-amplitude from the multiple-shooting continuation module; and
    iteratively, updating the multiple-shooting continuation module until a z-coordinate of the first patch point is equal to a desired threshold, then stop the iteration, to obtain the target orbit;
  computing a free trajectory with patch points along the free trajectory, such that each patch point along the free trajectory includes a position and a velocity;
  determining a feedback gain at each patch point of the patch points along the free trajectory, such that a state penalty function at each patch point of the free trajectory is set to match a state uncertainty function at a respective patch point of the free trajectory;
  applying the feedback gain at each patch point to map the position and the velocity at each patch point to delta v commands, in order to maintain the target orbit;
  outputting the delta v commands via an output interface to activate the at least one thruster for the trajectory-tracking control of the vehicle.

19. The non-transitory machine-readable medium of claim 18, wherein the state penalty function is a quadratic function including state penalty matrices, such that the state penalty matrices are determined by propagating a Riccati difference equation backwards in time, and the state uncertainty function is derived from the quadratic function, such that the state uncertainty function includes state uncertainty matrices, wherein the state uncertainty matrices are determined by a process comprising propagating closed-loop system dynamics, forwards in time, to obtain the state uncertainty matrices, and then repeating the process iteratively, until a convergence threshold that corresponds to a change in a feedback control law of less than 0.01%, wherein the feedback control law is obtained using the feedback gain at each patch point along the free trajectory.

20. The non-transitory machine-readable medium of claim 18, wherein the state penalty function at each patch point of the free trajectory is set to match a state uncertainty function at a previous patch point or a next patch point along the free trajectory, wherein the patch points along the free trajectory are sequential.

\* \* \* \* \*